United States Patent [19]

Rigsby

[11] Patent Number: 5,682,357
[45] Date of Patent: Oct. 28, 1997

[54] METHOD FOR OCEAN BOTTOM SURVEYS

[76] Inventor: Timothy B. Rigsby, 4107 Whitfield Ct., Fulshear, Tex. 77441

[21] Appl. No.: 568,206

[22] Filed: Dec. 6, 1995

Related U.S. Application Data

[60] Provisional application No. 60/004957, Oct. 6, 1995.
[51] Int. Cl.$^6$ ....................................................... G01V 1/38
[52] U.S. Cl. ............................................. 367/15; 181/110
[58] Field of Search ................................. 367/15, 16, 17, 367/18, 21, 56; 181/110, 112, 111

[56] References Cited

U.S. PATENT DOCUMENTS

| | | | |
|---|---|---|---|
| 2,324,378 | 7/1943 | Flude | 367/15 |
| 2,590,531 | 3/1952 | McLoad | 367/15 |
| 3,786,408 | 1/1974 | Jenkinson et al. | 367/21 |
| 4,233,677 | 11/1980 | Brown et al. | 367/15 |
| 4,415,997 | 11/1983 | Wilson | 367/15 |
| 4,516,227 | 5/1985 | Wener et al. | 367/15 |
| 4,693,336 | 9/1987 | Newman | 367/15 |
| 4,725,990 | 2/1988 | Zibilich, Jr. | 367/15 |
| 4,942,557 | 7/1990 | Seriff | 367/15 |
| 5,257,241 | 10/1993 | Henderson et al. | 367/15 |
| 5,430,689 | 7/1995 | Rigsby et al. | 367/15 |

*Primary Examiner*—Ian J. Lobo
*Attorney, Agent, or Firm*—Gordon T. Arnold

[57] ABSTRACT

A method for acquiring seismic data, the method comprising: deploying a first ocean-bottom cable from a first cable-handling/recording vessel; generating first source waves with a source vessel for data acquisition; recording data from the first ocean-bottom cable with the first cable-handling/recording vessel during the generating first source waves; preparing a second ocean-bottom cable with a second cable-handling/recording vessel during the generating first source waves; generating second source waves with the source vessel for data acquisition; and recording data from the second ocean-bottom cable with the second cable-handling/recording vessel during the generating second source waves. A method for acquiring seismic data, the method comprising: deploying a first ocean-bottom cable from a first cable-handling/recording vessel; deploying a second ocean-bottom cable from the first cable-handling/recording vessel; generating first source waves with a source vessel for data acquisition; recording data from the first and second ocean-bottom cables with the first cable-handling/recording vessel during the generating first source waves; preparing a third ocean-bottom cable with a second cable-handling/recording vessel during the generating first source waves; generating second source waves with the source vessel for data acquisition; and recording data from the second and third ocean-bottom cables with the second cable-handling/recording vessel during the generating second source waves. A method for acquiring seismic data, the method comprising: generating first seismic waves from a first seismic source associated with a source vessel; generating second seismic waves nonconcurrent with the generating first seismic waves from a second seismic source associated with the source vessel; receiving reflected seismic waves with an ocean-bottom receiver; and recording the reflected seismic waves.

34 Claims, 17 Drawing Sheets

METHOD FOR OCEAN BOTTOM SURVEYS

FIELD OF THE INVENTION

This application claims priority under 35 U.S.C. §119(e) to Provisional application Ser. No. 60/004,957, filed on Oct. 6, 1995, still pending. The present invention relates to Ocean Bottom Seismic techniques and methods for deploying/ retrieving cable systems and recording seismic data.

BACKGROUND OF THE INVENTION

The ocean-bottom cable (OBC) method employs fixed arrays of receivers on the ocean bottom and a marine vessel towing only a source array. In ocean-bottom work, one of the most costly aspects of the operation is the operational costs of the many vessels required. Previously, at least three vessels were required for OBC operations: a source vessel towing only the airgun source arrays, a recording vessel that remains stationary while attached to the ocean-bottom cables, and at least one cable vessel to lay and retrieve those cables. Most operations consist of from four to six vessels, with additional cable vessels and a utility boat. Improvements as to the accuracy of the data collected and the efficiency of the overall method have been achieved through the present invention by modifying the source vessel and combining the functions of the cable boats and the recording boats into single vessels.

The industry has taught the use of three vessels for ocean-bottom work since the inception of the technology. Deployment and retrieval of the cables is a difficult task. The deck space necessary for storage of the cables is significant and required the devotion of the entire deck space. Similarly, the recording and power equipment necessary to receive and record data from the cables is significant and also required the devotion of an entire vessel.

The use of separate vessels for cable handling and data recording yields excessive operation costs due to down time of the various vessels. With a three vessel system, the cable vessel would first lay the OBC while the source vessel and the recording vessel wait nearby. Next, the recording vessel precisely locates each receiver on the OBC and is coupled to the OBC for a recording configuration while the cable vessel and the source vessel wait nearby. Next, the source vessel begins shooting while the recording vessel records the reflected seismic waves received by the OBC. Of course, the cable vessel must wait nearby until the shooting is finished. Finally, the OBC is uncoupled from the recording vessel and retrieved by the cable vessel. The cable vessel then deploys the OBC in a new location and the process is repeated.

Also, the ocean bottom seismic systems have used only a single source deployed from each source vessel. A single source allows the reading of only one set of data points for each pass of the source vessel. The source vessel must tow the source to each designated source point so that a source wave may be generated from that source point sources. However, if multiple sources are towed from a single source vessel, multiple sets of data points may be obtained with one pass of the source vessel.

The above-described process results in excessive downtime for recording, requiring the source boat to wait during either deployment or testing of cable. Also, the source vessel must make multiple passes over the survey area to provide seismic waves at the desired locations. It is an object of the present invention to reduce this problem.

SUMMARY OF THE INVENTION

The present invention makes more efficient use of the vessels by reducing the number of vessels required and increasing the number of sources towed by the source vessel. The operations of the cable vessels and the recording vessels are, according to the present invention, performed by single vessels The invention yields a 200% increase in the amount of data received per unit of operation cost, compared to the long standing industry three-vessel, single source practice.

According to one aspect of the invention, there is provided a method for acquiring seismic data. One embodiment of the method comprises: deploying a first ocean-bottom cable from a first cable-handling/recording vessel; generating first source waves with a source vessel for data acquisition; recording data from the first ocean-bottom cable with the first cable-handling/recording vessel during the generating first source waves; preparing a second ocean-bottom cable with a second cable-handling/recording vessel during the generating first source waves; generating second source waves with the source vessel for data acquisition; and recording data from the second ocean-bottom cable with the second cable-handling/recording vessel during the generating second source waves.

According to a further embodiment of the invention, there is provided a method for acquiring seismic data, the method comprising: deploying a first ocean-bottom cable from a first cable-handling/recording vessel; preparing the first ocean-bottom cable for data collection with the first cable-handling/recording vessel; generating first source waves with a source vessel for data acquisition; recording data from the first ocean-bottom cable with the first cable-handling/recording vessel during the generating first source waves; deploying the second ocean-bottom cable with the second cable-handling/recording vessel during the generating first source waves; preparing a second ocean-bottom cable with a second cable-handling/recording vessel during the generating first source waves; generating second source waves with the source vessel for data acquisition; recording data from the second ocean-bottom cable with the second cable-handling/recording vessel during the generating second source waves; and retrieving the first ocean-bottom cable onto the first cable-handling/recording vessel during the generating second source waves.

According to a still further embodiment of the invention, there is provided a method for acquiring seismic data, the method comprising: deploying a first ocean-bottom cable from a first cable-handling/recording vessel; deploying a second ocean-bottom cable from the first cable-handling/ recording vessel; generating first source waves with a source vessel for data acquisition; recording data from the first and second ocean-bottom cables with the first cable-handling/ recording vessel during the generating first source waves; preparing a third ocean-bottom cable with a second cable-handling/recording vessel during the generating first source waves; generating second source waves with the source vessel for data acquisition; and recording data from the second and third ocean-bottom cables with the second cable-handling/recording vessel during the generating second source waves.

According to another aspect of the invention, there is provided a method for acquiring seismic data. One embodiment of the method comprises: generating first seismic waves from a first seismic source associated with a source vessel; generating second seismic waves nonconcurrent with the generating first seismic waves from a second seismic source associated with the source vessel; receiving reflected seismic waves with an ocean-bottom receiver; and recording the reflected seismic waves.

According to a further embodiment of the invention, there is provided a method for acquiring seismic data, the method comprising: towing first and second sources from a source vessel wherein the second source is farther from the source vessel than the first source; towing the sources until the first source is positioned at a first survey line; generating a first seismic wave from the first source at the first survey line; towing the sources until the second source is positioned at the first survey line; and generating a second seismic wave from the second source at the first survey line.

BRIEF DESCRIPTION OF THE DRAWING

The present invention is better understood by reading the following description of nonlimitative embodiments with reference to the attached drawings, which are briefly described as follows.

It is to be noted, however, that the appended drawings illustrate only typical embodiments of the invention and are therefore not to be considered a limitation of the scope of the invention which includes other equally effective embodiments.

DETAILED DESCRIPTION OF THE INVENTION

Figure 1:
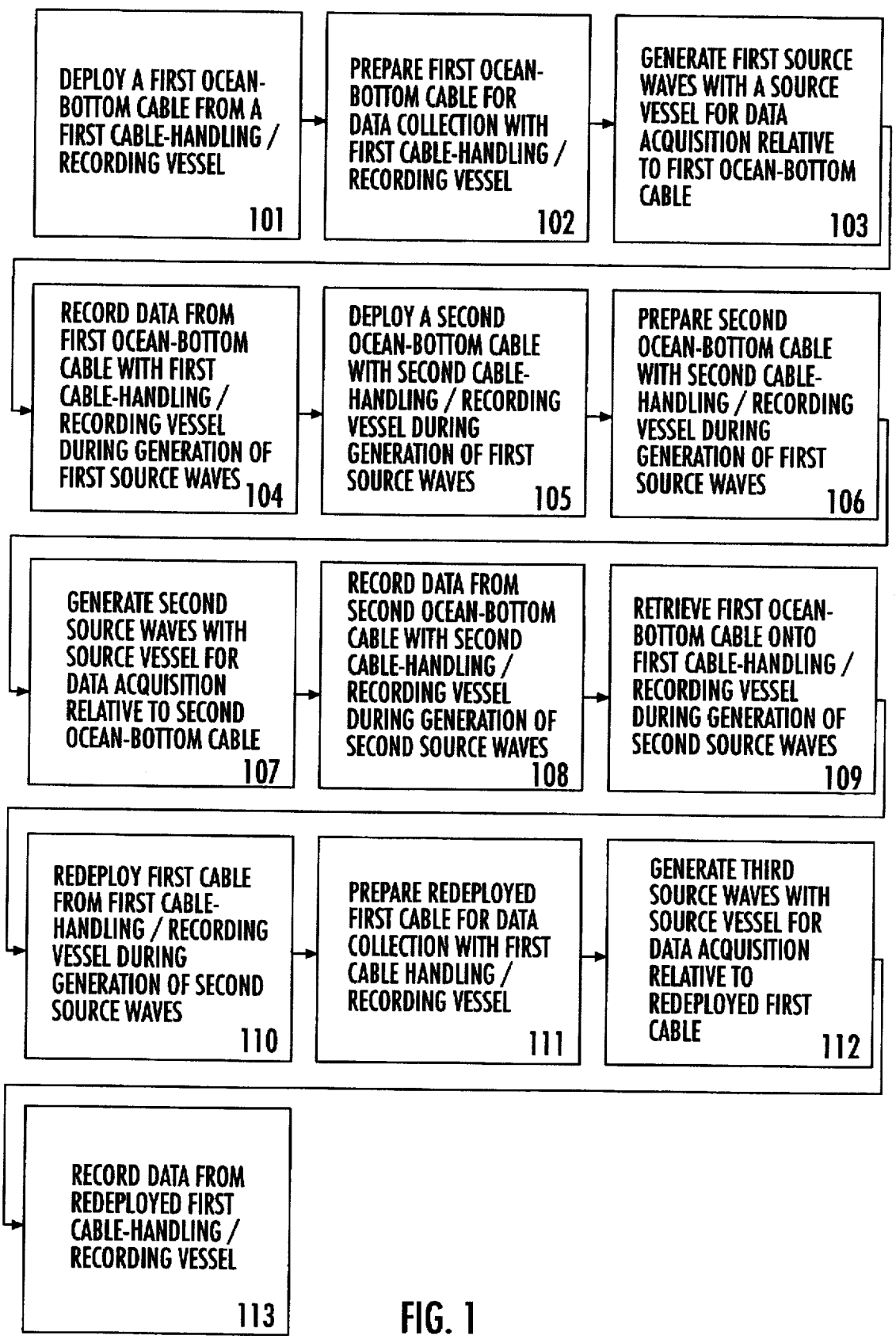
FIG. 1 is a flowchart of one embodiment of the invention.
Figure 2:
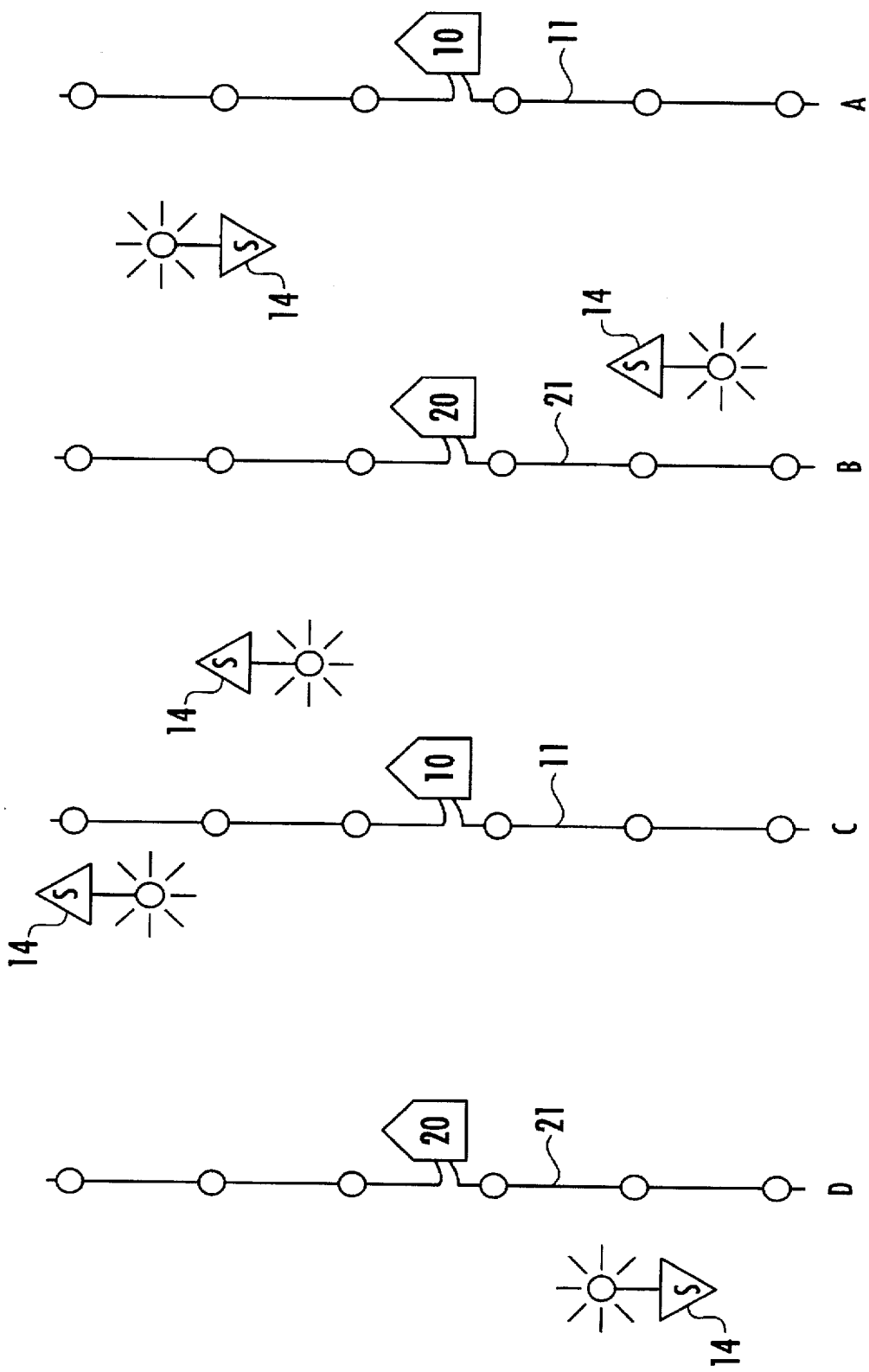
FIG. 2 is diagram of one configuration for implementing one embodiment of the invention.

Referring to FIGS. 1 and 2, there is shown a flow chart of steps for acquiring seismic data and a diagram for configuration of ocean-bottom cables and vessels. The method is describe with reference to both Figures.

First, a first cable-handling/recording vessel deploys a first ocean-bottom cable (101). This is the ocean-bottom cable (11) at the cable #11 first position. The cable-handling/ recording vessel is so identified because it has the ability to both deploy and retrieve ocean-bottom cable, and record seismic data transmitted by the cable. Signal receivers (15) are located at various points along the cable (11). These signal receivers (15) comprise hydrophones and geophones which are coupled together to remove water-column reverberations from each reflection wavelet by recording simultaneously the signals from both the hydrophone (pressure sensor) and the geophone (velocity sensor) at each receiver location. A detailed discussion of the deployment apparatus follows below.

The cable-handling/recording vessel (10) then prepares (102) the cable (11) to receive seismic data. The preparation process includes: calibration of the recording equipment onboard the vessel (11); locating precisely the receivers (15); testing the cable (11) and receivers (15). These tests are discussed in greater detail below.

Figure 5:
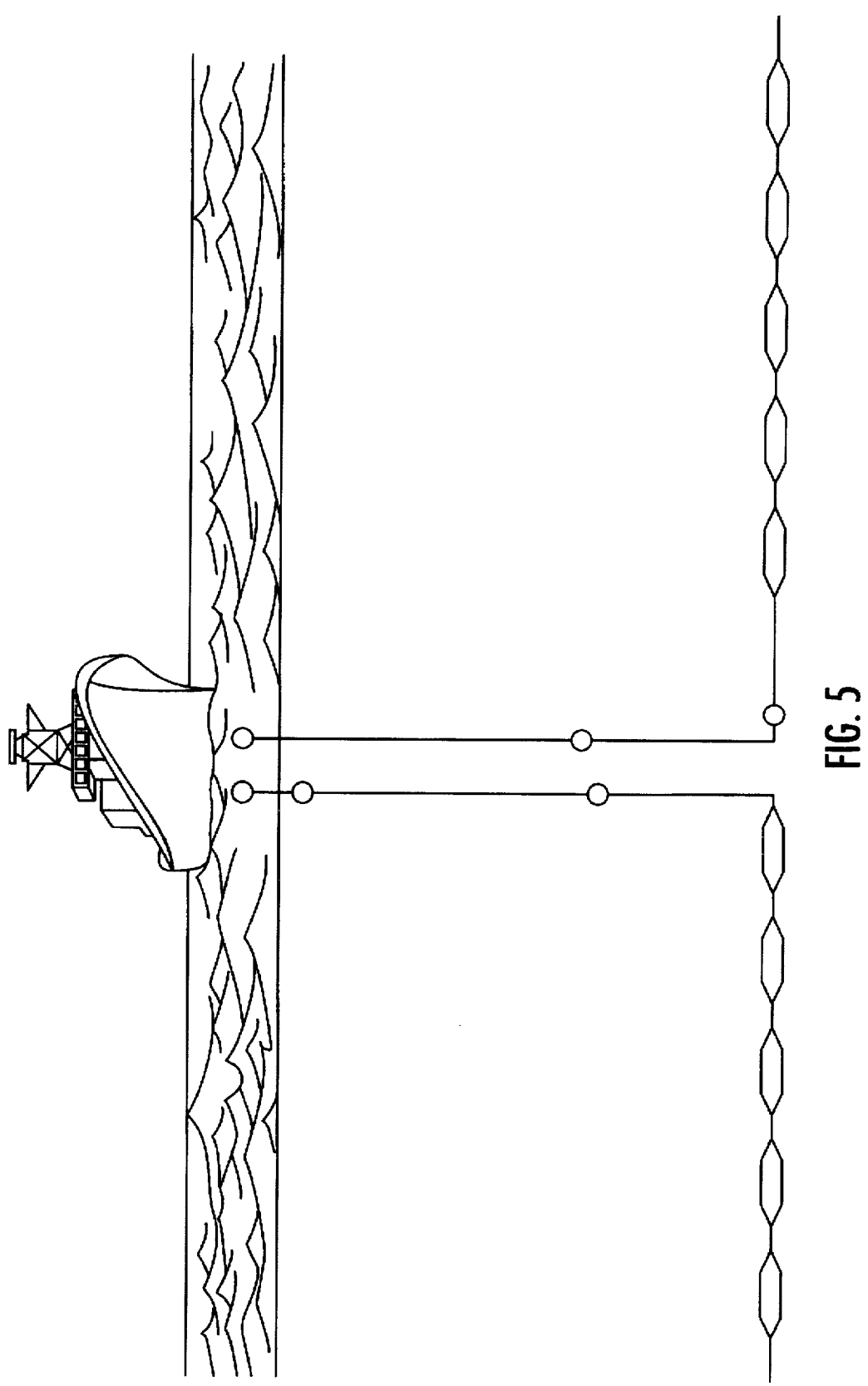
FIG. 5 is a diagram of the cables coupled to the cable-handling/recording vessel.

At some point, either during or after preparing the cable for data acquisition, the cable is coupled to the cable-handling/recording vessel (10). This coupling enables the cable-handling/recording vessel (10) to provide power to the cable (11) and to receive the seismic data from the cable (11) (see FIG. 5).

Once the cable (11) is prepared for data acquisition, the source vessel (14) begins to generate (103) source waves in the water above the cable (11). The source vessel traverses the area in the vicinity over the cable generating source waves from various predetermined points. The cable-handling/recording vessel (10) then records (104) seismic data received by the cable (11).

While the source vessel (14) is generating waves and the cable-handling/recording vessel is recording data, a second cable-handling/recording vessel (20) is deploying (105) a second cable (21). The cable-handling/recording vessel (20) then prepares (106) the cable (21) to receive seismic data just as the first cable-handling/recording vessel (10) had done previously. The preparation process again includes: calibration of the recording equipment onboard the vessel (21); locating precisely the receivers (15); testing the cable (21) and receivers (15).

This cable (21) is positioned in such a way that as the source vessel (14) traverses over an area between the cables, both cables obtain data from the same source waves generated by the source vessel (14) (see FIG. 2). Initially, the source vessel (14) operates near cable (11) and only cable-handling/recording vessel (10) records data. Later, as the source vessel (14) works away from the cable (11) and toward the cable (21), both cable-handling/recording vessels (10) and (20) record data. Finally, as the source vessel (14) approaches cable (21) and generates source waves (107), only cable-handling/recording vessel (20) records data (108).

When the cable-handling/recording vessel (10) is no longer recording data, the cable-handling/recording vessel (10) decouples from the cable (11) and then begins to retrieve (109) the cable (11). Retrieval comprises pulling the cable up from the ocean floor and storing the cable on the vessel. A complete discussion of cable retrieval follows below.

After the cable (11) is safely stored on the cable-handling/recording vessel (10), the vessel (10) then redeploys (110) the cable (11) at a position opposite the cable (21) from where the cable (11) was initially deployed (see FIG. 2, cable #11 second position). Again, the cable-handling/recording vessel (10) prepares (111) the cable (11) to receive seismic data. The preparation process, as before, includes: calibration of the recording equipment onboard the vessel (11); locating precisely the receivers (15); testing the cable (11) and receivers (15). The cable-handling/recording vessel (10) couples to the cable (11) so as to be able to record data from the cable (11).

As the source vessel (14) works away from the cable (21) and toward the redeployed cable (11), it is generating a third set of source waves (112). Then, cable-handling/recording vessel (10) begins to record data (113). Thus, both cable-handling/recording vessels (10) and (20) are again recording at the same time. As source vessel (14) becomes closer to the redeployed cable (11), cable-handling/recording vessel (20) ceases to record.

Cable-handling/recording vessel (20) then decouples from and retrieves the cable (21) just as cable-handling/recording vessel (10) had done before. Cable-handling/recording vessel (20) then redeploys the cable (21) at a position opposite the cable (11) from where the cable (21) was initially deployed (see FIG. 2, cable #21 second position). Again, the cable-handling/recording vessel (20) prepares the cable (21) to receive seismic data. The cable-handling/recording vessel (20) couples to the cable (21) so as to be able to record data from the cable (21). This entire process continues until the survey is complete.

Figure 3:
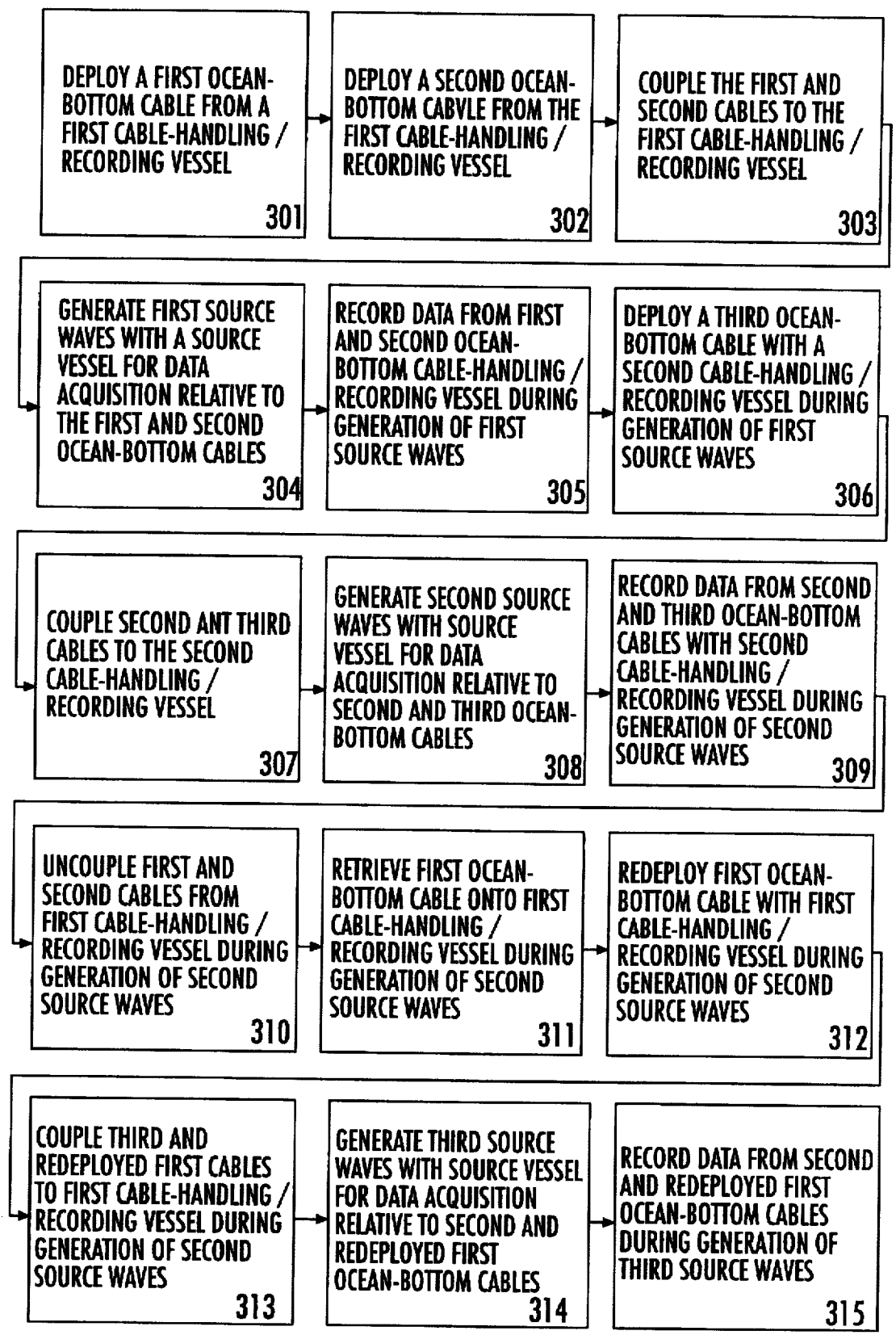
FIG. 3 is a flowchart of one embodiment of the invention.
Figure 4:
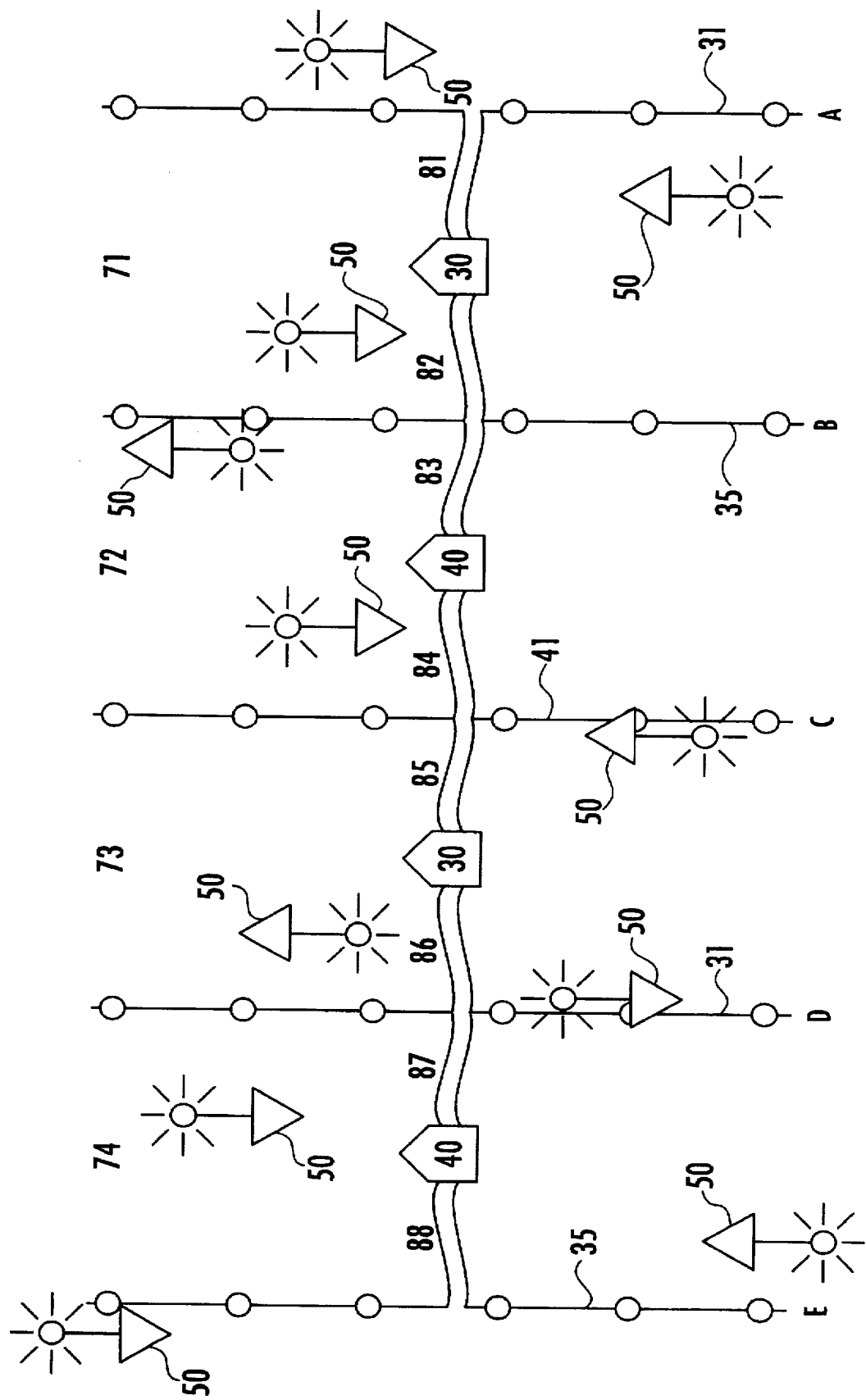
FIG. 4 is a diagram of one configuration for implementing one embodiment of the invention.

Referring to FIGS. 3 and 4, a flowchart of another method for acquiring seismic data is shown and a diagram for configuration of ocean-bottom cables and vessels in accord with this method. First, cable-handling/recording vessel (30) deploys (301) an ocean-bottom cable (31) on the ocean floor. A second cable (35) is also deployed (302) near cable (31) so that an area (71) on the ocean floor is disposed between. Both of these cables are coupled (303) to cable-handling/recording vessel (30) via couplers (81) and (82). A source vessel (50) traverses the area (101) and generates (304) a first set of source waves at particular locations. Cablehandling/recording vessel (30) records (305) data obtained from cables (30) and (35) at the same time.

While the source vessel (50) is generating (304) in area (71) and cable-handling/recording vessel (30) is recording (305), a third cable (41) is deployed (306) by cable-handling/recording vessel (40). The cable-handling/recording vessel (40) then couples (307) to both cables (35) and (41) via couplers (83) and (84). Source vessel (50) continues to work its way across area (71) until it eventually passes over cable (35). When the source vessel (50) begins generating in area (72) it is generating (308) a second set of source waves. Cable-handling/recording vessel (40) then records (309) data received by cables (35) and (41).

While the source vessel (50) is generating (308) in area (72), cable-handling/recording vessel (30) then uncouples (310) couplers (81) and (82). It then retrieves (311) the cable (31) from cable #31 first position and redeploys (312) the cable (31) in cable #31 second position. Cable-handling/recording vessel (31) then couples (313) to cables (31) and (41) via couplers (85) and (86).

As source vessel (50) traverses across area (72), it eventually passes over cable (41) in its first position and into area (73). At this point, source vessel (50) begins to generate (314) a third set of source waves. Cable-handling/recording vessel (30) then records (315) the data received by cable (41) and redeployed cable (31). This process continues as cable-handling/recording vessel (40) uncouples from cables (35) and (41) and retrieves cable (35) for redeployment opposing cable (31) into a cable #35 second position. Another aspect of the invention comprises modification of the source vessel used in ocean bottom surveys. Multiple seismic wave sources are used in association with a single source vessel. Also, the sources are timed according to the speed of the source vessel so that the sources generate seismic waves at particular locations. The sources can be made to generate seismic waves at positions which correspond to straight survey lines. These survey lines may be perpendicular to the track line of the source vessel, but they need not necessarily be so.

Figure 18:
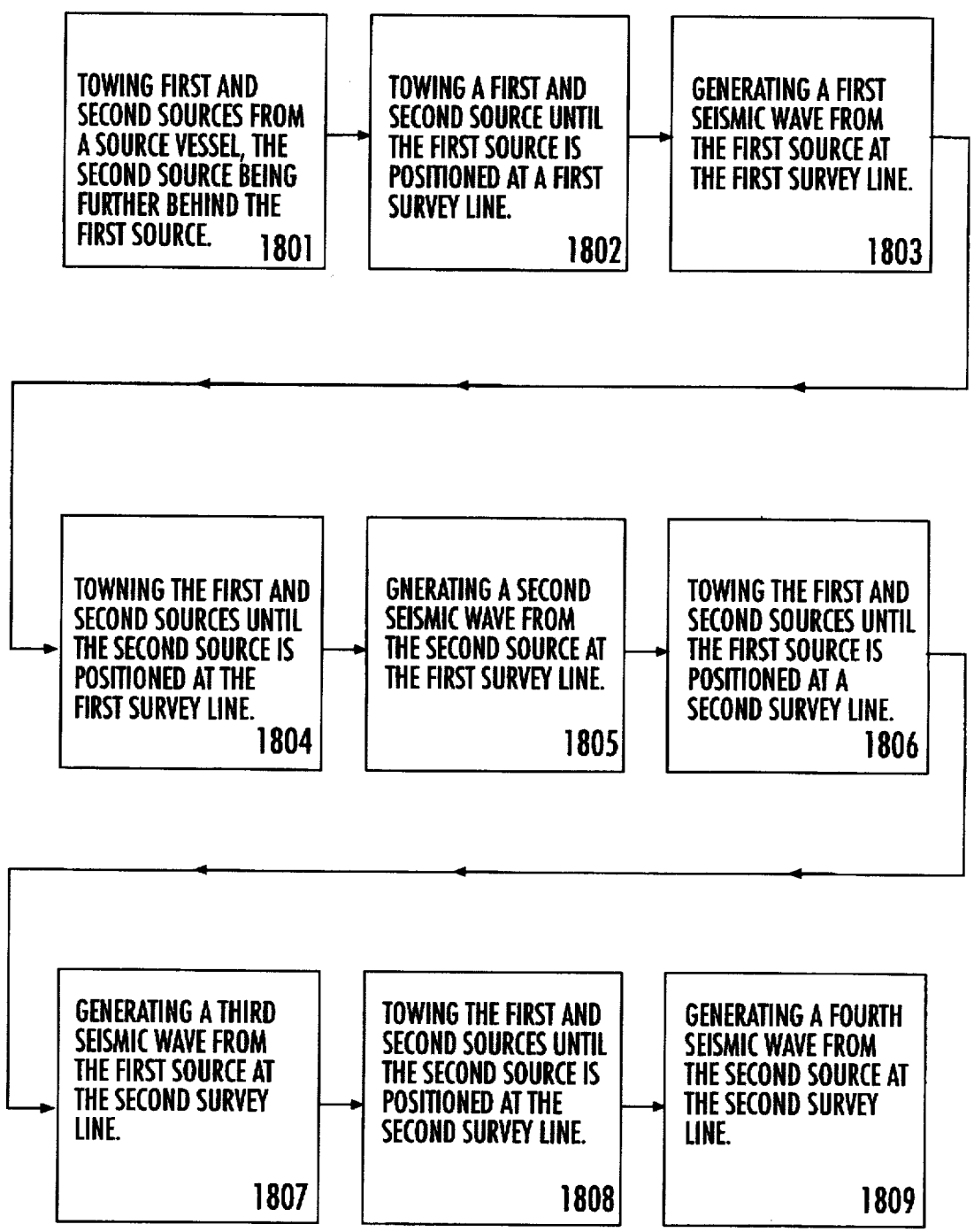
FIG. 18 provides a flowchart for a method of acquiring ocean bottom seismic data.
Figure 19:
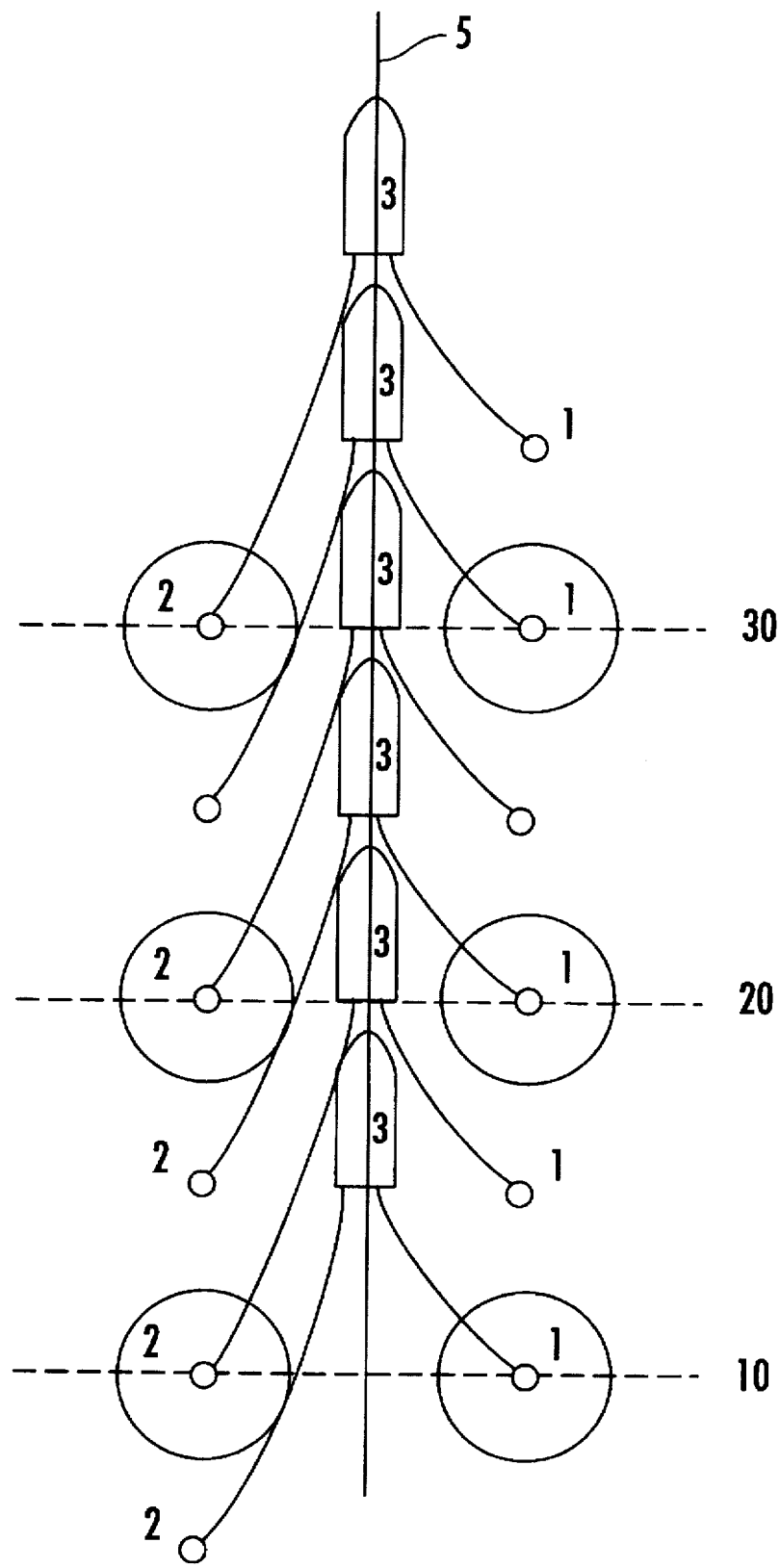
FIG. 19 provides a diagram of a configuration for associating seismic wave sources with a source vessel.

Referring to FIGS. 18 and 19, there is shown a method for acquiring seismic data from an ocean bottom survey. The method comprises towing (1801) a first seismic source (1) and a second seismic source (2) from a source vessel (3). The second seismic source (2) is towed further behind the source vessel (3) than the first seismic source (1). The sources are towed (1802) until the first seismic source (1) is positioned at a first survey line (10). A seismic wave is then generated (1803) from the first seismic source (1) at the first survey line (10). Next, the sources are towed (1804) until the second seismic source (2) is positioned at the first survey line (10). A second seismic wave is generated (1805) by the second seismic source (2) at the first survey line (10). The source vessel continues towing (1806) both of the sources until the first seismic source (1) is positioned at a second survey line (20). A third seismic wave is generated (1807) by the first seismic source (1) at the second survey line (20). The source vessel then tows (1808) the sources until the second seismic source (2) is positioned at the second survey line (20). A fourth seismic wave is generated (1809) at the second survey line (20) by the second seismic source (2). This process continues until seismic waves have been generated at appropriate points on the survey lines. In this particular method, the survey lines are perpendicular to the track line (5) of the source vessel. If the survey lines are not perpendicular to the track line of the source vessel, the sources may still be made to generate seismic waves from points on the survey lines, by varying the relative distance of the sources to the source vessel. Also, the timing of the sources may be configured so that the source vessel may maintain a constant velocity as it tows the sources over the survey lines.

Several modifications to the ocean-bottom seismic technology combine to make the present invention possible. These include: cable handling systems, recording and cable-powering systems, position and navigation systems, and receiver locations systems.

Cable Handling System. The cable-handling/recording vessels are fully self contained and capable of housing it's crew complement and sustaining operations of more than five weeks at sea. Each vessel is equipped with a complete complement of cable handling gear that is interchangeable between the various vessels.

The handling equipment includes:

Large diameter drum mounted forward of the wheel house one eight wheel drive squirter and control pedestal for retrieval Teflon coated guide which is flooded during cable retrieval operations and carries the cabling form the front squirter to the rear deck where the cable is stacked automatically.

a 4 cyld hydraulic power pac (diesel)that powers the entire system two wheel side squirter that slides on rails from bin to bin four wheel drive deployment squirter and control pedestal for deployment of the cabling seine blocks for moving cable quickly around on deck antennas mounted over the drop points back deck buzzer boxes for mark points hand held radios equipped with headsets for communication with navigation and the bridge (each boat has a discreet frequency during cable operations for safety an integrated Navigation system for each vessel fathometer for each cable vessel The cable-handling/recording boats are also equipped with a third power pac that will be used in the event of a failure.

In addition, the cable-handling/recording vessels are equipped with the Syntrac cable QC system which allows the cable Vessel to interrogate equipment independently of the recording operations. By QC'ing the equipment from both cable vessels, operators may ensure that the equipment is within spec prior to deploying the gear, which will result in a better quality product. The boats are equipped with Macha phone scans TDR's and rotary check boxes for QC of individual sensors, or complete cables. In addition to the cable QC the cable-handling/recording vessels are equipped with the Syntron Acoustic system (ARPS & BATES) which acts as a back up to the acoustical system aboard the source vessel.

A typical patch layout will commence with two of the cable-handling/recording vessels running parallel course but in opposite directions, on two adjacent receiver lines. These vessels start a line layout with a straight run in an end with a turn toward the adjacent line. One of the vessels then connects the lines together with jumpers and runs the jumpers to the DP site where the cable-handling/recording vessel will be located for recording. The cable-handling/recording vessels can also take the surface buoys that have been left and replace them with submersible acoustically released buoys that are remotely triggered via a deck box and transmitter. The cable boats are crewed for 24 hour operations and typically a four man crew will be aligned to each of two shifts.

Once the patch is in the water and connected the cable-handling/recorder vessel will hook up to one leg of the patch (up to 480 channels). The Syntrak System will then be used to QC the sensors on the bottom and check for any telemetry or power leakage problems. With the spread within specifications the cable-handling/Recording vessel begins to locate the receivers on the sea floor.

Figure 6:
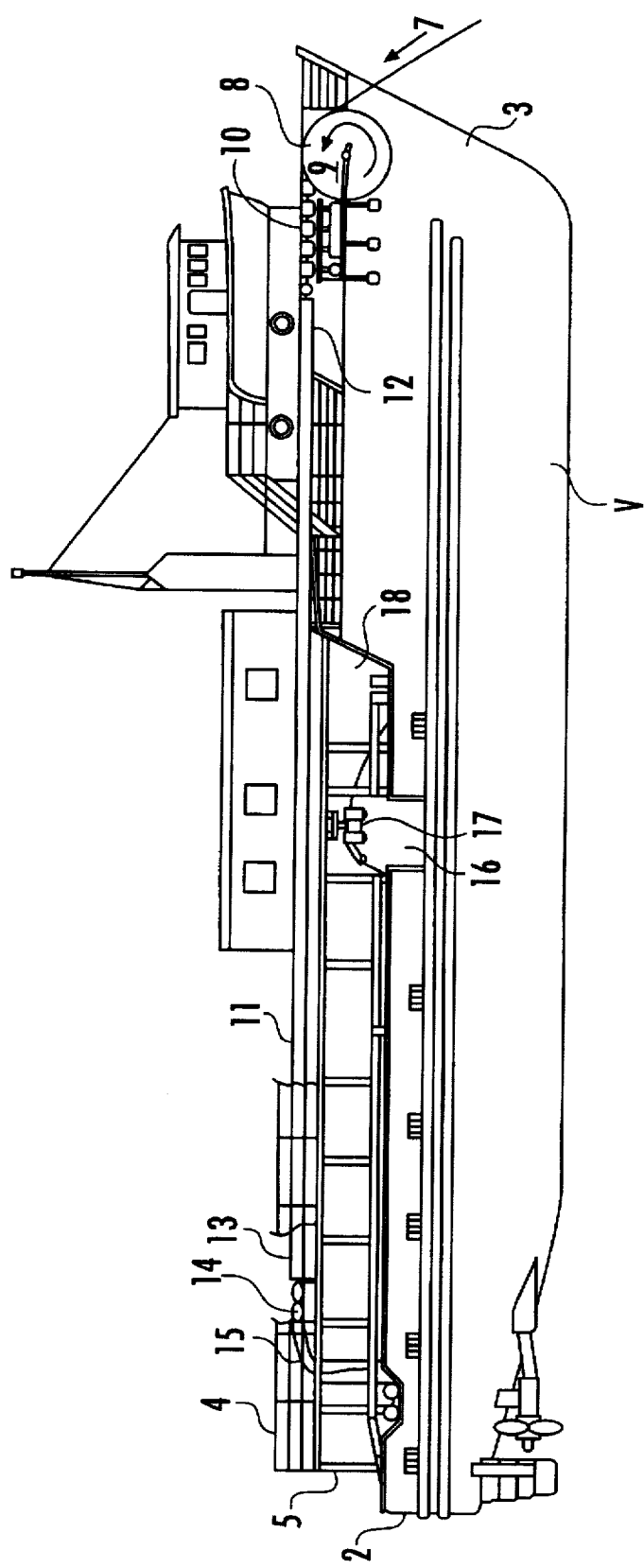
FIG. 6 provides a side view of the cable deployment/ retrieval system of the present invention, further illustrating an exemplary vessel upon which the system is provided, as well as an exemplary cable during retrieval.

As shown in FIG. 6, the exemplary, preferred embodiment of the present invention is contemplated for utilization in conjunction with a vessel V having a bow 1 or forward end, a stem 2 or rear end, a port and starboard 3 sides, an upper level deck 4 and a main level deck 5. The present system is configured for the deployment and retrieval of seismic type cable, the embodiment of the present invention operating in conjunction with bottom type seismic cable.

During seismic operations, lengths of rather heavy and cumbersome seismic cable are deployed form the stem of the vessel and, once deployed, the cable is utilized to monitor seismic activity, particularly for hydrocarbon exploration purposes. Retrieval of the cable has been a difficult and somewhat manual intensive task, and while prior systems utilized devices for pulling cable from the water, none are believed to have provided a system which did not require extensive hands-on control of the cable. Generally, the present system retrieves cable 6 from the water from the bow of the vessel, utilizing a rather large, vertically situated bow retrieval wheel 7 which rotates 9 as the cable is being pulled 7 via a forward wheel puller 10.

From the forward wheel puller, the cable is placed upon the forward end 12 of a cable tray 11, which runs generally the length of the vessel, the cable sliding (25 in FIG. 7) along the length of the tray 11 and exiting at the rear portion 13 of the tray, wherein the cable passes through a rear cable puller 14, urging the cable through a cable chute, which in turn deposits the cable upon the main level deck 16.

Figure 7:
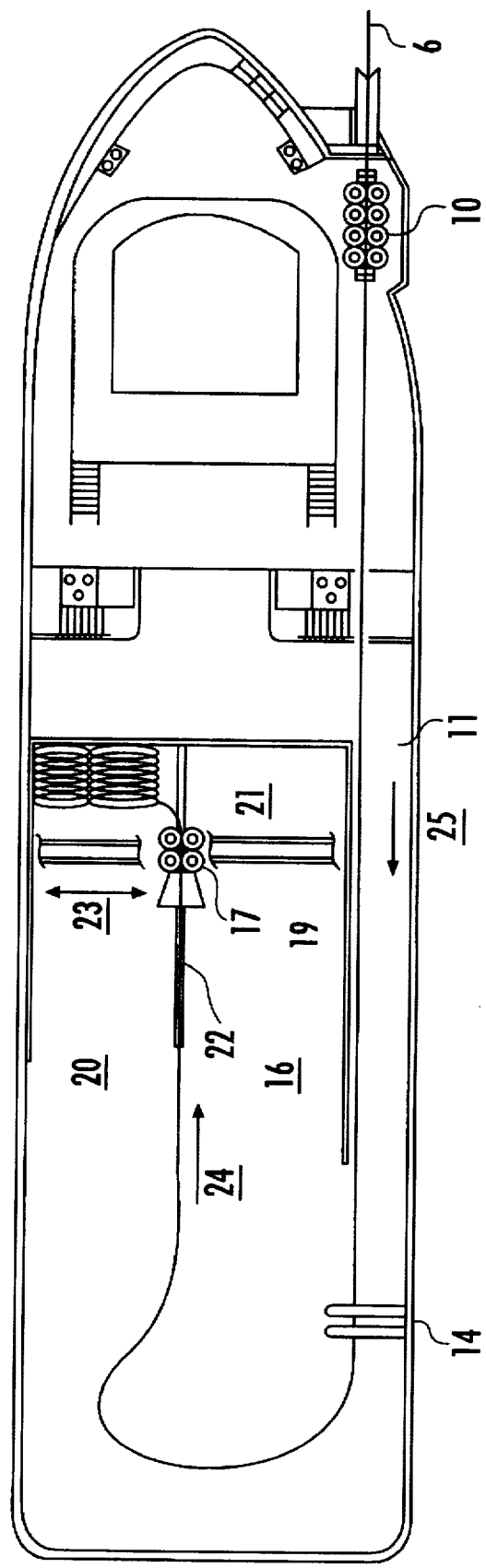
FIG. 7 provides a top, partially cut-away view of the cable deployment/retrieval system of FIG. 6, illustrating the various elements of the cable deployment/retrieval system and their respective locations on an exemplary vessel, as well as an exemplary cable being retrieved and stored.

Referring to FIG. 7, the cable then passes through a cable puller trolley 17, which pulls 24 and positions the cable, depositing it in this figure into the front portion 18 of the cable bin area on the main deck, as would occur in the early stages of a typical cable retrieval operation. The trolley is further maneuvered throughout the retrieval operation as the cable pile grows in the cable bin, laying out the cable in a manner so as to avoid binding or knots. The trolley is mounted upon an overhead gantry 19, allowing for the transversal 23 and longitudinal positioning of the trolley throughout the main deck area. As shown the cable storage area may be divided into first and second bins 20, 21, respectively, via dividing well 22; this feature has been found to be particularly advantageous in high sea operating conditions, so as to better support the cable piles and prevent shifting thereof.

Figure 8:
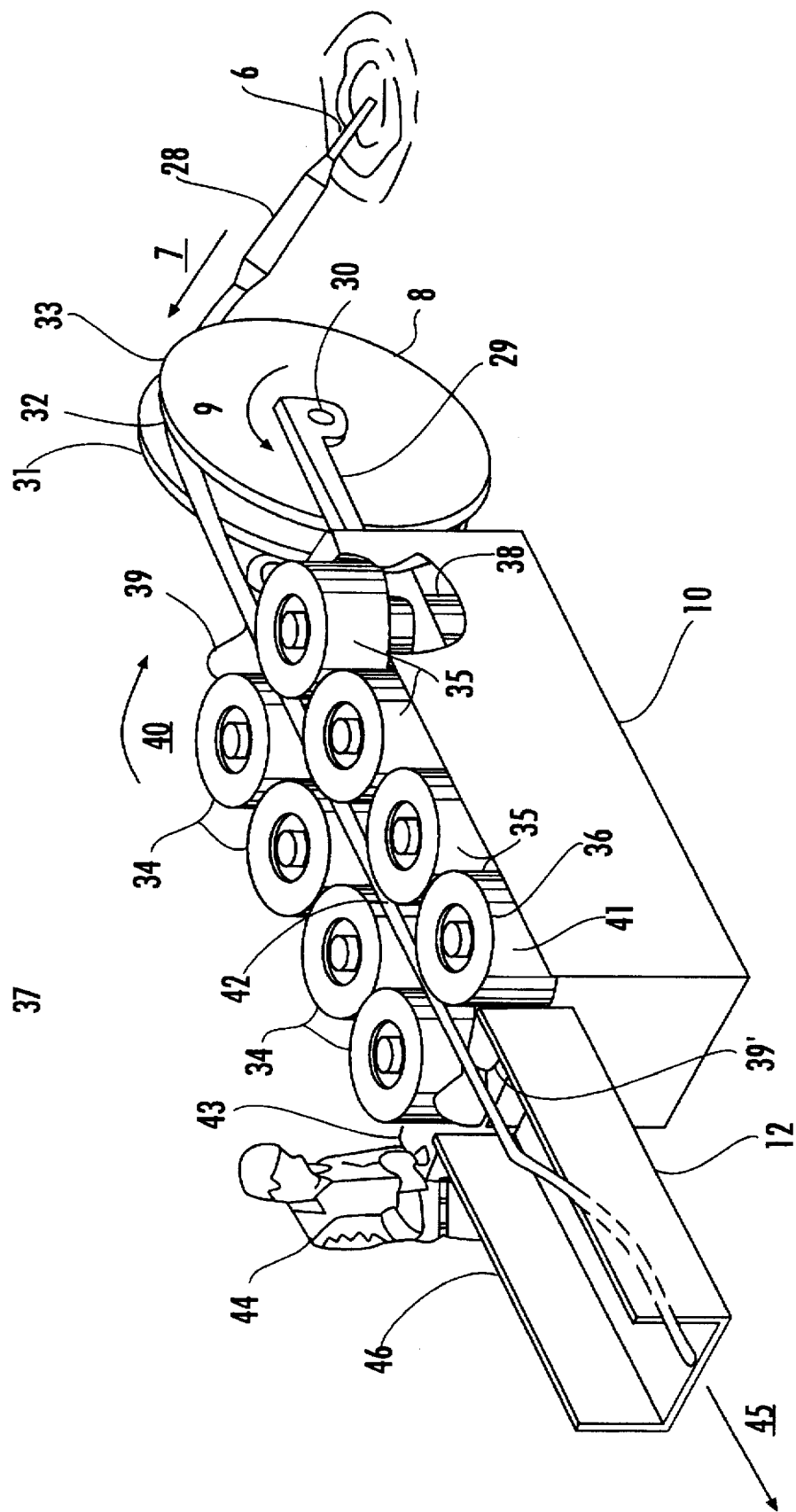
FIG. 8 provides an isometric, partially cut-away view of the cable deployment/retrieval system of FIG. 6, illustrating a more detailed view of the bow retrieval wheel and eight wheel front cable puller pulling a seismic cable.

For a more detailed discussion of the retrieval system of the preferred, exemplary embodiment of the present invention, we refer to FIG. 8. During the retrieval operation the cable end to be retrieved would typically have a retrieval buoy affixed thereto, which would be retrieved via grappling hook or the like via the crew. The cable end would then be lifted, placed over the wheel 8, and threaded through the front cable puller 10.

The bow retrieval wheel 8 of the preferred, exemplary embodiment of the present invention is about nine feet (9') in outer diameter, and is free wheeling utilizing teflon bushings and beatings for low maintenance. The preferred embodiment is aluminum in construction so as to be non-corrosive. The wheel 8 is situated in the present system in a generally vertical fashion along the starboard side of the bow of the vessel above the water, and is supported by a frame 29 which engages the axis 30 of the wheel. The wheel includes a hub 31 portion about its outer diameter, which is coated, for example, with a one inch bed 32 of high density neoprene, or vulcanized rubber, to protect and cushion the cable from possible damage.

The wheel is configured to lift and support the cable 6, including any connectors 28, along the wheel's upper portion 33, allowing the cable to ride over the wheel, the cable thereafter engage the front wheel puller 10, which is directly behind and aligned with the wheel 8. Thusly, the wheel is positioned so as to lift, align, and steer the cable from the water, for passage through the front wheel puller 10.

Once having been lifted form the water and aligned by the wheel puller, the cable next is pulled and guided by the eight wheel cable puller, comprising first 34 and second 35, horizontally situated sets of rotatable wheels, paired so as to contact the cable and pull it along. As shown, the present system utilizes inflated tires 36 on hubs as the wheels, each of the tires supported via a vertical axle 37, which in turn is rotated via a pneumatic or electric motor 38 or the like. The preferred, exemplary embodiment of the present invention utilizes eight respective motors, one for each wheel, utilizing a Charlyn model #104, 2000 series hydraulic motor with 11.9 cubic inches displacement. The unit is powered by a 50 horsepower electric motor operating at 25 GPM.

Rollers 39, 39' may be provided to position the cable so as to contact the outer diameters of the tires, between the respective pairs. As further illustrated, the pairs of tires are configured so as to be spaced 42 so as to each contact the cable (along the outer diameter 41 of the tires) with sufficient force so as to frictionally pull the cable upon the powered rotation of the tires. The spacing and rotational speed of the respective pulling pairs of tires may be varied, as necessary, via control box 43, which may be operated by personnel 44, or may be automatic, with the utilization of approximately placed sensors and switches.

In use, the shipside tires would rotate in a clockwise 40 fashion, as the opposing tires would rotate in a counter-clockwise fashion, thereby frictionally urging the cable along 45 in a forward manner, into the front portion 12 of the cable tray (11 in FIG. 6). Further, the directions would be reversible as necessary, for drawing the cable backward. In addition, sensors may be provided to monitor the pulling force of the cable, especially in rough seas, and the cable puller controls may be configured so as to slow, stop, or reverse when the sensor indicates excessive pulling force on the cable. Likewise, the vessel speed control may be linked to the speed of the cablepuller, so as to facilitate the quickest, least stress means of retrieving the cable.

The tires are oversized and to some degree, under-inflated, to allow for the "soft" gripping of the cable, providing sufficient gripping for pulling the cable, while allowing the tires to give in with the passage of a larger diameter connector 28 therethrough, so as not to have to vary the mechanical space between the tires during the retrieval of the cable.

The preferred, exemplary embodiment of the front eight wheel cable puller is designed to run at a top operating speed of 97 RPM each wheel with the present components. Each pair of wheels is capable of providing 315 pounds of line pull, providing a total of 1260 pounds of line pull alone, without assistance from other cable pullers in the system. More details on the operation of the cable puller will be discussed infra.

Referring to FIGS. 6, 7 and 8, the tray 11 runs generally the length of the starboard side of the vessel, along the upper level deck, and is lined 46 with ultra high molecular weight (UHMW) teflon sheet material, so that the cable will slide easily to the rear of the vessel. In the present, exemplary embodiment, the trays are about one hundred feet (100') long.

Figure 9:
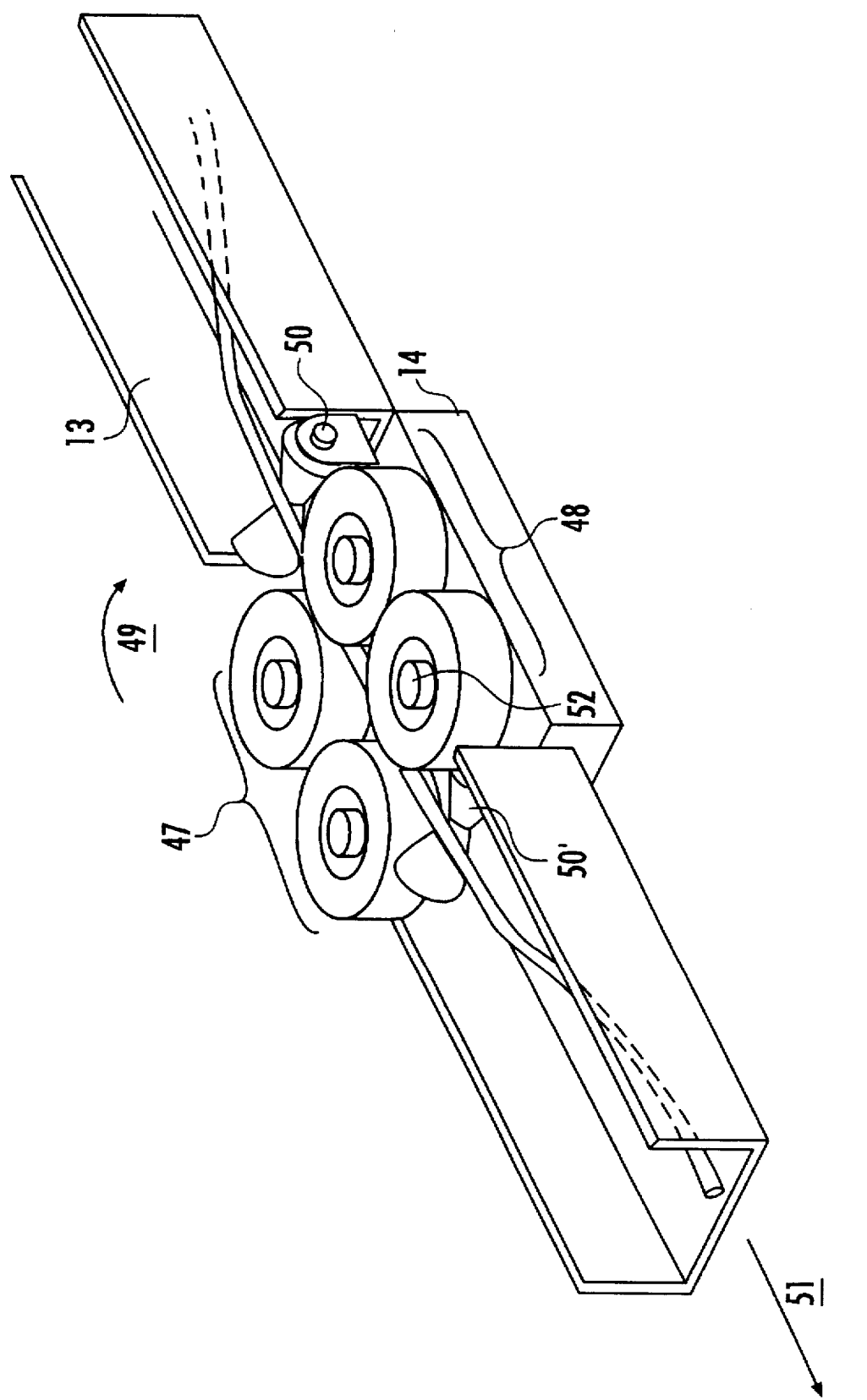
FIG. 9 provides an isometric view of the cable deployment/retrieval system of FIG. 6, illustrating with particularly the cable tray and rear cable puller.

Referring to FIG. 9, located at the rear end 13 of the tray is the rear cable puller, which the preferred embodiment of the present invention contemplates as being a two wheel puller, but may also include a four wheel puller, as shown, which may be advantageous on longer ships, for example. The puller is arranged of first 47 and second 48 sets of puller wheels arranged in horizontal fashion, and operates along the same methodology and arrangement as the front eight wheel cable puller, supra. The rear cable puller 14 may further include front 50 and rear 50' rollers situated at the ingress and egress points of the puller, as well as between the sets of rollers, in systems with more than two wheels, for better positioning the cable between the drive wheels.

The rear cable puller 14 pulls the cable down through the trays, and further drives the cable 51 to the chute to the lower, main deck, as will be further discussed below. This unit has the same type hydraulic motors as the front cable puller, and may be powered, if desired, by the power pack on the front unit so that both units run in series and at the same speed, thereby providing uniform control of the cable passing therebetween.

Figure 10:
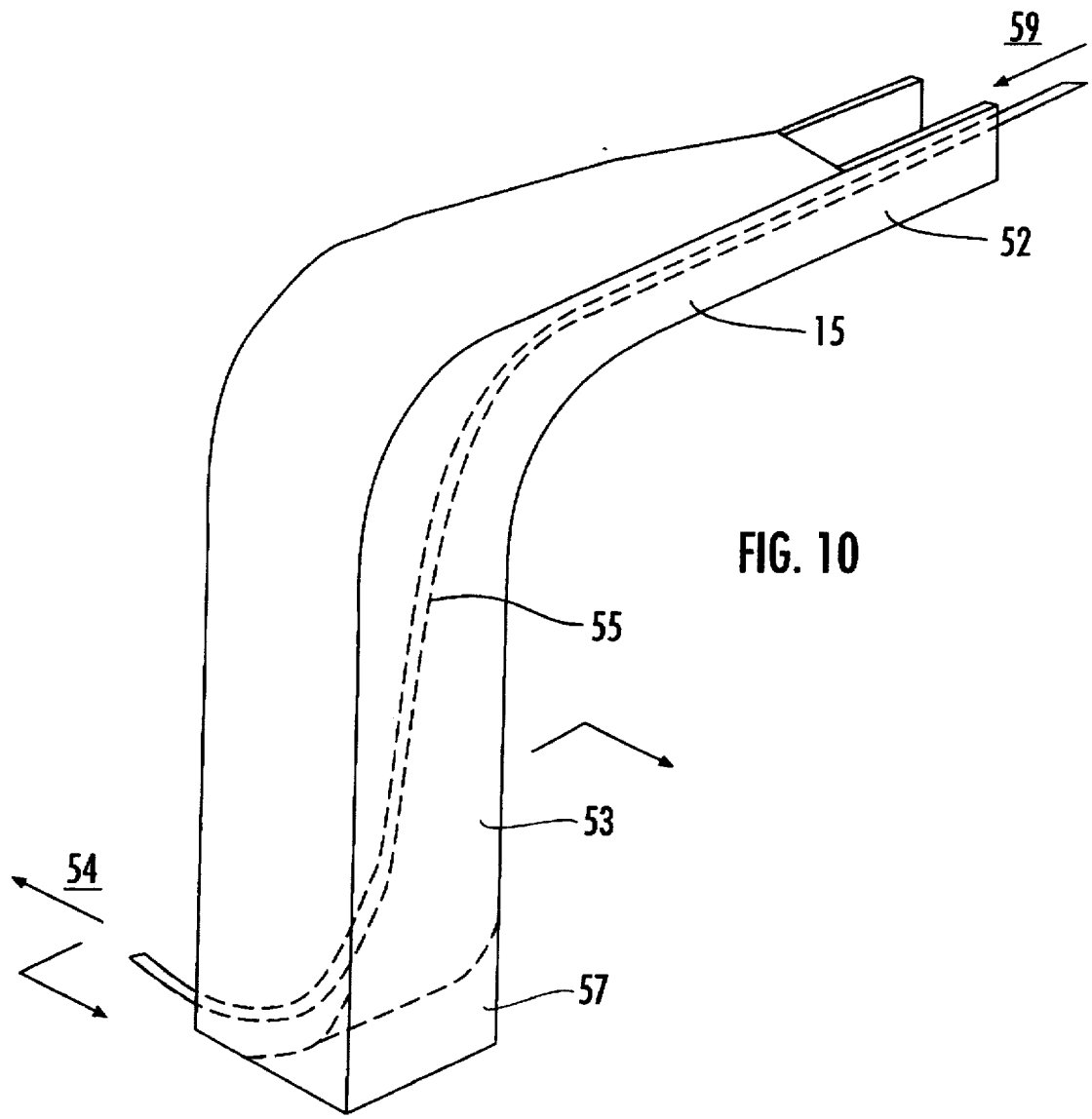
FIG. 10 provides an isometric view of the cable deployment/retrieval system of FIG. 6, illustrating particularly the cable chute for guiding the cable from the upper deck to the main deck.
Figure 11:
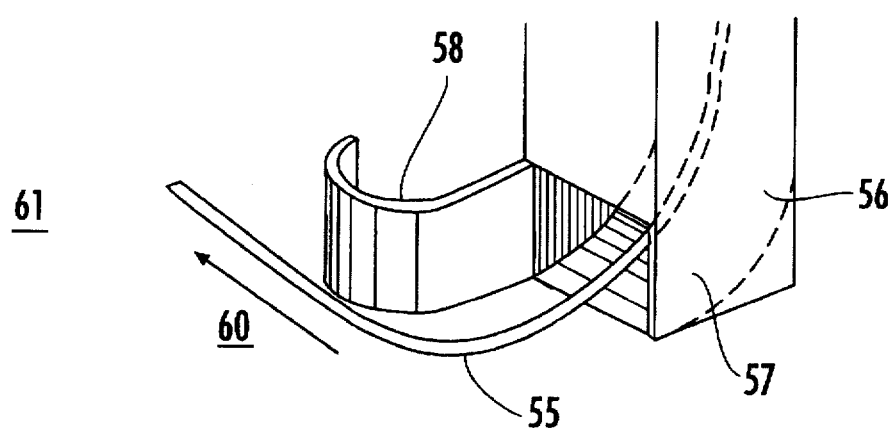
FIG. 11 provides a top view of the cable deployment/ retrieval system of FIG. 6, illustrating particularly the lower portion of the cable chute of FIG. 10.

Referring now to FIGS. 10 and 11, once the cable has been drawn through the rear cable puller, it is urged 59 into the upper, horizontal, generally opening 52 of the cable chute 15 which is configured to direct the cable 55 from its longitudinal path at the upper level, generally vertically 53 down to the main deck level, to be deposited in a generally transversal 54 fashion on the main deck level 61. At the lower section 57 of the chute may be provided a radial slide 56 for urging the cable along in a non-damaging fashion; also, a lip 58 may be provided to further guide 60 the cable along the path generally towards the bow of the ship. The chute may also be configured, as necessary and desirable, such that the cable is deposited in a generally reverse longitudinal fashion, with the cable running out onto the main deck directly towards the bow of the ship, as opposed to the transverse discharge, above.

Figure 12:
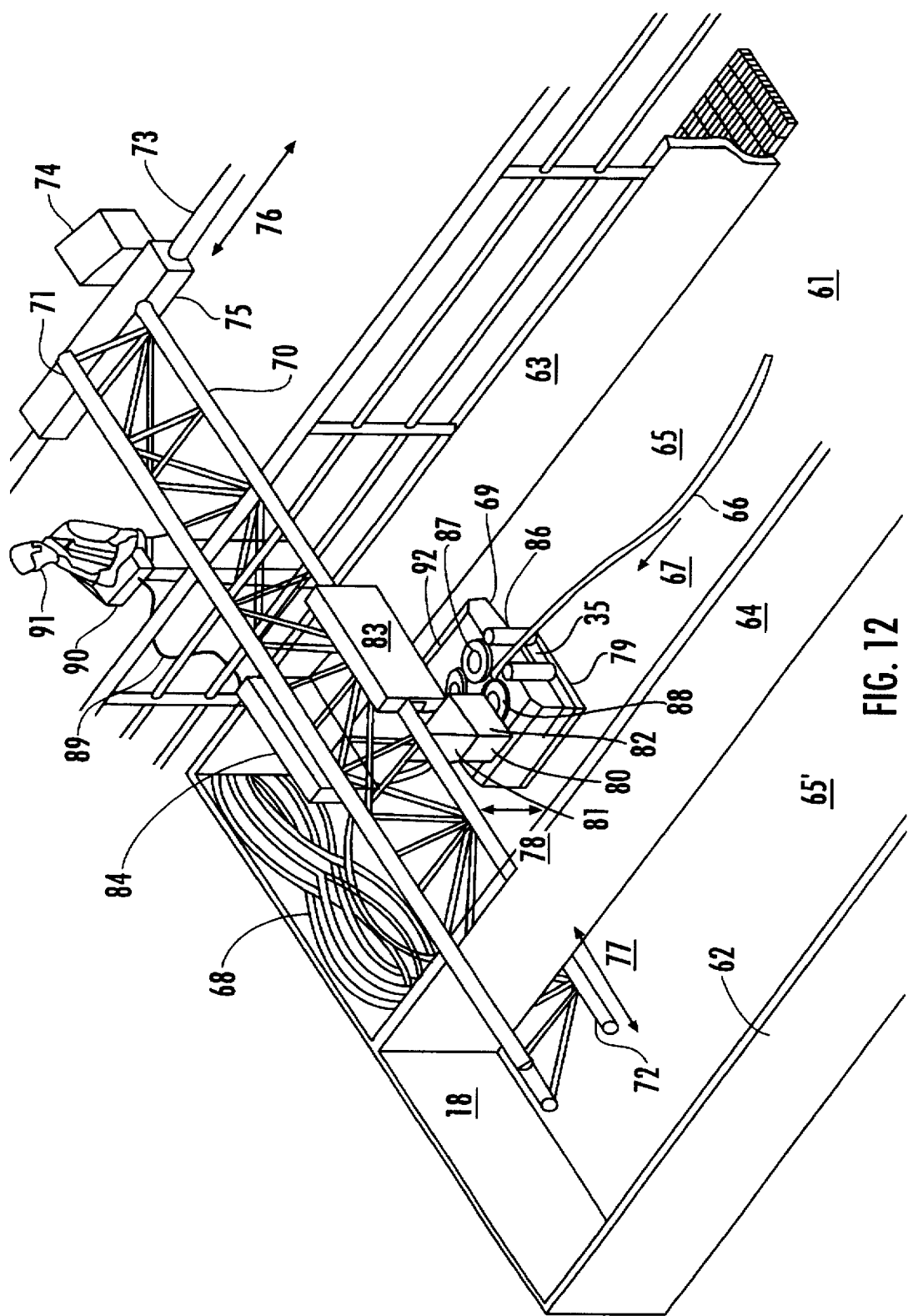
FIG. 12 provides an upper isometric view of the cable deployment/retrieval system of FIG. 6, illustrating the operation of the cable trolley system deploying cable into the cable storage bin.

Referring to FIG. 12, the main deck level 61 includes a cable storage area, running from generally the back of the main cabin to the rear of the boat, and comprising in the exemplary embodiment first 65 and second 65' cable storage bins, formed by a dividing wall 64 and contained by side walls 63, 62, respectively, and end wall, situated at the front portion 18 of the main deck. The cable retaining walls in the exemplary embodiment are about four feet (4') high, and fabricated with 3/16" plate.

Floating above the cable storage area is trolley assembly 69, which supports a floating cable puller 79 for motivating or pulling 67 cable 66 urging same into a pile 68 in the storage bin. The cable puller 79 includes an ingress opening 35 which receives the cable, which cable is pulled via first 87 and second 88 sets of horizontally situated puller wheels, each supported via vertical axis 87 and driven via motor 92. The floating cable puller may be a two or four wheel puller, as preferred and desirable, and it is constructed and operates in the same fashion as set further with the cable pullers discussed supra.

The floating cable puller 79 is supported by a gantry 70 having a first 71 and second 72 ends, each end of the gantry slidingly supported, via rolling support members 75, by a longitudinal support member 73, the longitudinal support members running along opposing lengths along the underside of the upper level deck, and extending from the back of the main cabin to the rear of the vessel. A motor 74 is provided with the rolling support members at each end of the gantry to motivate the gantry along the longitudinal support members, thereby moving the gantry in a generally longitudinal direction 76 along the vessel's main deck. In the preferred, exemplary embodiment of the present invention, the trolley moves about 150 feet per minute in a direction generally longitudinally aligned with the axis of the vessel. The trolley assembly 69 may also be motivated in a side to side direction, i.e., movement transversal 77 to the longitudinal axis of vessel, via rolling gantry support 83 which is powered via motor 84.

In addition to longitudinal and transversal movement (relative to the longitudinal axis of the vessel), the vertical position 78 of the floating cable puller 79 may be varied via the vertical support member 80, which is telescoping, having an upper support piece 81 which slidingly engages a lower support piece 82. The telescoping action may be provided via reciprocating hydraulic piston, electronic servo, or a multitude of other off-the-shelf technologies.

The vertical (up-down), transversal (side-side), and the longitudinal (front-rear & vise versa) may be controlled via control chassis 90, which controls the respective motors or other motivating means for trolley positioning discussed supra. Infrared, RF, or wire 89 may be utilized to communicate the commands from the control box to the trolley assembly. An individual 91 or an automated system, such as a computer, may control the position of the system. In addition, the control chassis or automated system also should control the floating cable puller, including the selective operation, such as on-off, speed, and direction, and spacing of the wheels, as necessary and desirable.

Figure 13:
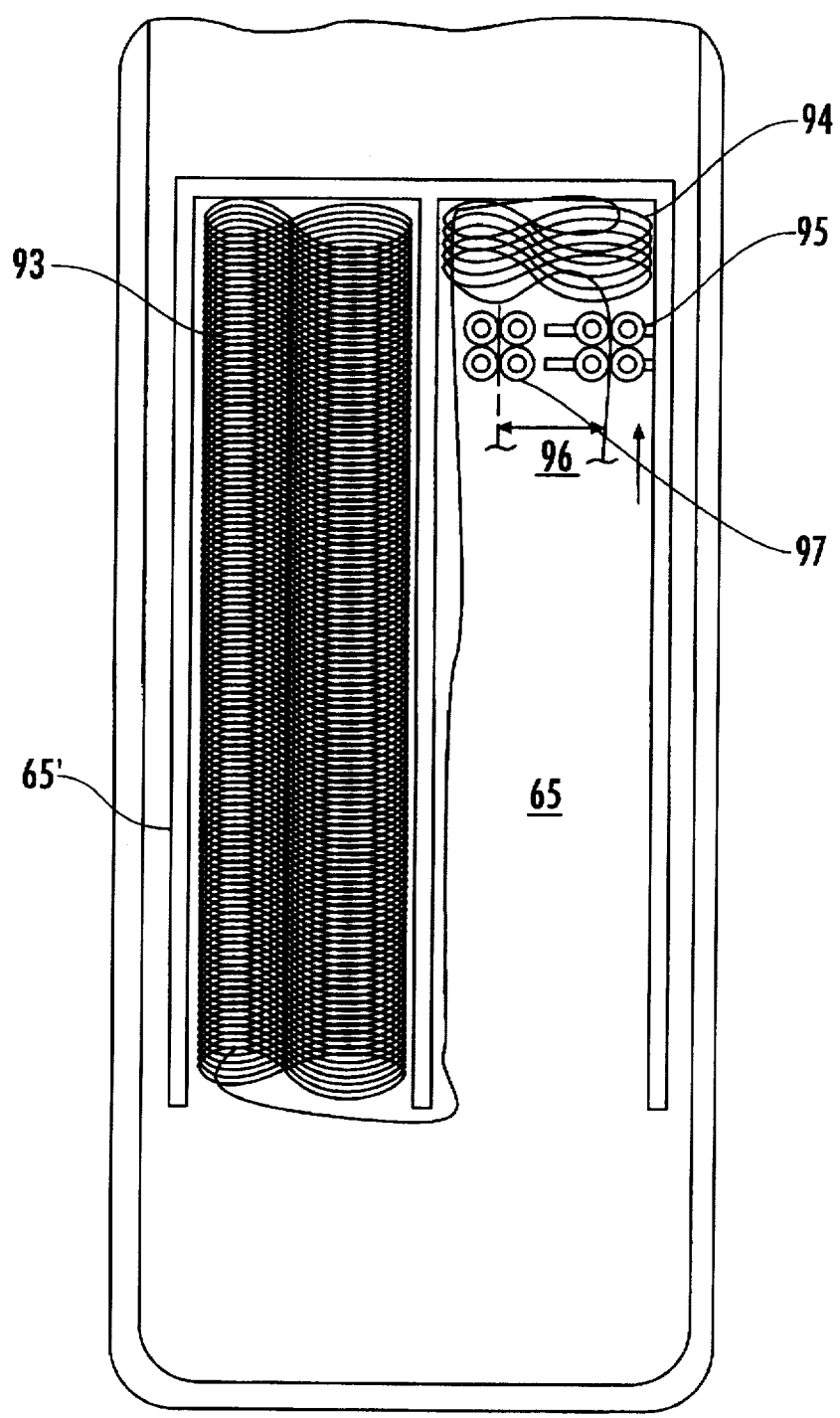
FIG. 13 provides a top, cross-sectional view of the cable deployment retrieval system of FIG. 6, illustrating the relative movement of trolley.

Generally, in forming the pile 68 of cable in the cable bin, the trolley only need be positioned in spaced relation with the pile, in about the center of the bin, in a vertical position about the height of the cable pile, and not too fast cable puller speed, and the cable will generally pile itself in a uniform manner. Referring to FIG. 13, the cable, once piled 93 to fill one bin 65' (in cases where split bins are utilized), the trolley is then motivated to the from of the other bin 65, forming a new pile 94. if the cable begins to knot or bind during piling, or if the type of cable is difficult to motivate, the trolley 95 may be motivated to move 97 along the gantry in a side to side movement 96, as a speed consistent with the speed of the cable puller, to in effect spool the cable onto the pile in an unbinding fashion. This process may be automated into various programmed routines, depending upon the type and size of cable bin, cable type, and operating conditions.

Figure 13A:
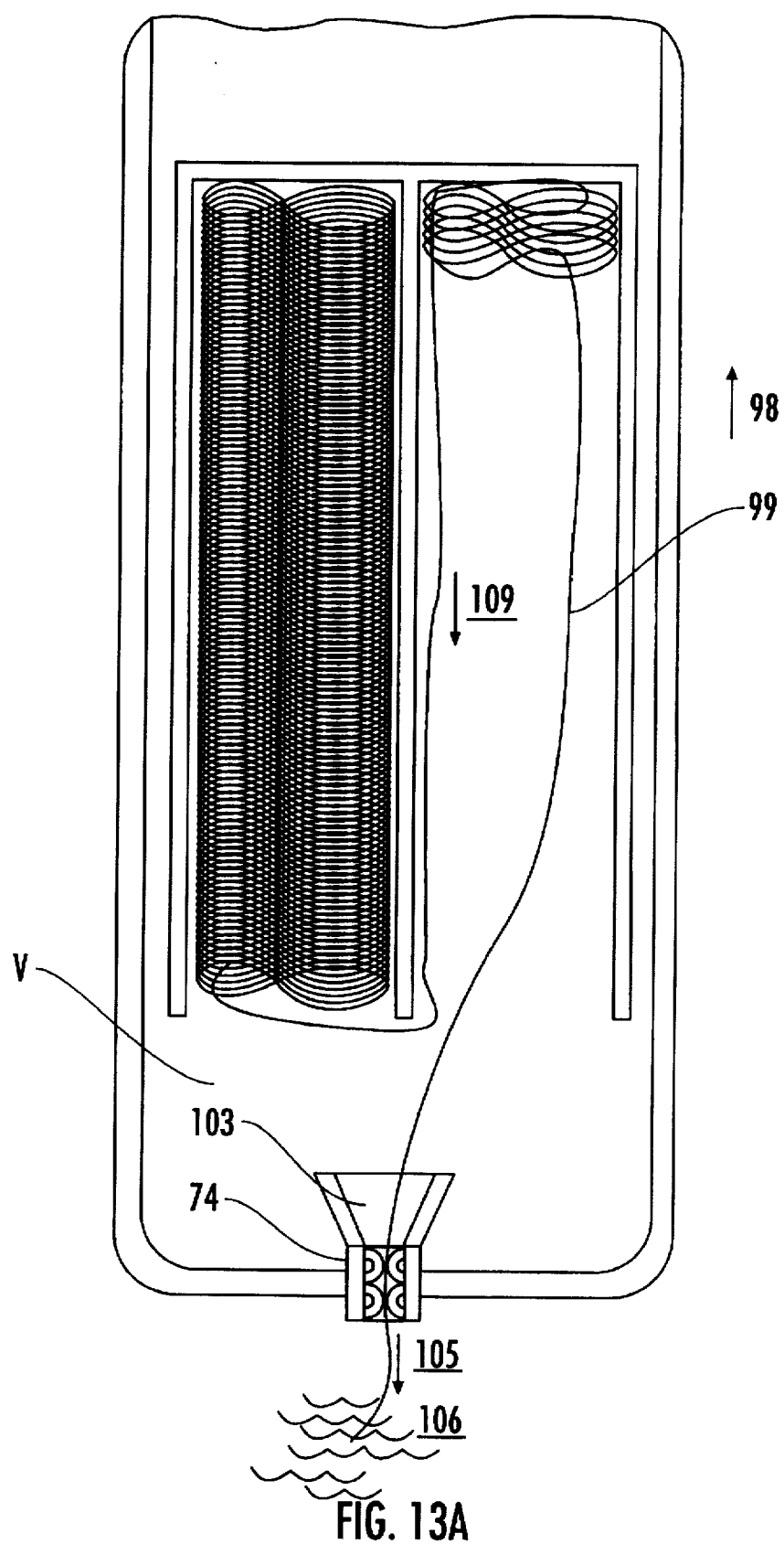
FIG. 13a is a topview of the cable deployment/retrieval system, illustrating the lump storage of cable in the cable storage bins.

Now referring to FIG. 13A, to deploy the cable to sea from the storage bin, the trolley is positioned at the stem of the vessel, such that the floating cable puller is generally adjacent to the rear end of the vessel, and may be locked into place in a predetermined deployment area, as desired, via locking pin or the like. The first end of the cable is then threaded through the cable puller, and the puller then initiated so as to pull 109 the cable 99 out 105 of the vessel into the water 106. The vessel V may be powered in a forward direction 98 to evenly spool out the cable. A ramp 103 may e provided to urge the cable up into the wheel puller area of the cable puller 79, which ramp could removably attach to the cable puller, as desired. During cable deployment operations, the floating cable puller speed control may be linked to the speed of the vessel, for optimal deployment of the cable.

Figure 15:
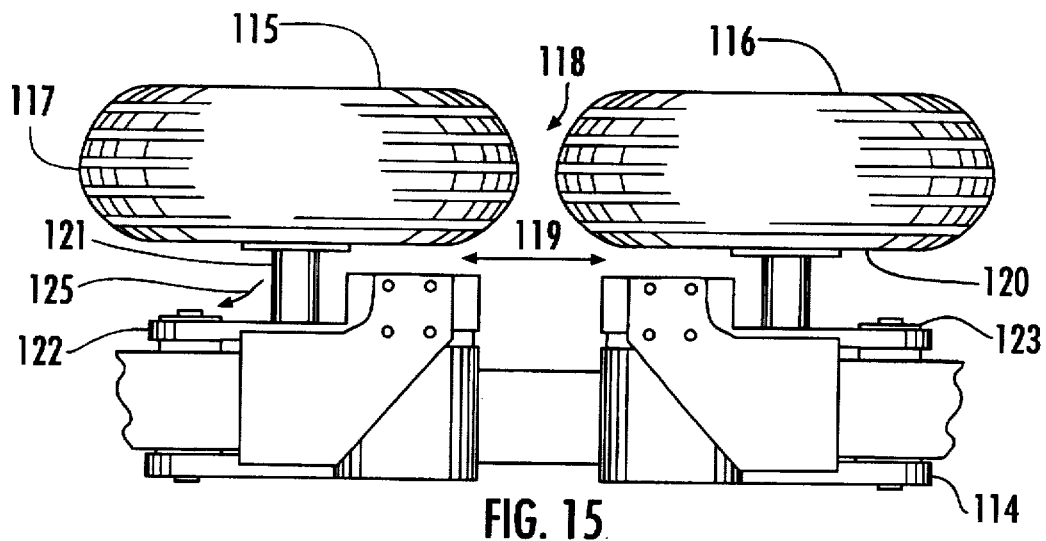
FIG. 15 provides an end view of the cable deployment/ retrieval system of FIG. 6, illustrating the position of two tires in a cable puller arrangement as utilized in the present invention.

Referring now to FIG. 15, the front and rear cable pullers on the upper level deck, and the floating cable puller on the main deck all utilize a common cable pulling system, which provides a superior means of pulling seismic cable, and the relatively large diameter connectors associated therewith. As shown, the cable puller 114 includes first 115 and second 116 sets of horizontally situated tires on hubs 120, the tires positioned to form a gripping space 118 therebetween, each of the tires further having an outer diameter gripping face 117. While varying the space between the tires 118 is not particularly necessary with the present system, as will be more fully explained below, it may be advantageous to vary the spacing, and accordingly, the preferred, exemplary embodiment of the invention includes such a means to vary 119 the spacing between the tires. As further shown, each of the hubs is supported by a vertical shaft 121 which rests upon support member 122, which in turn is pivotally connected 123 to the support chassis; pivoting 125 of this support member 122 results in movement of the supported wheel member, resulting in a varying 119 of the spacing between the wheels 115, 116.

Figure 16:
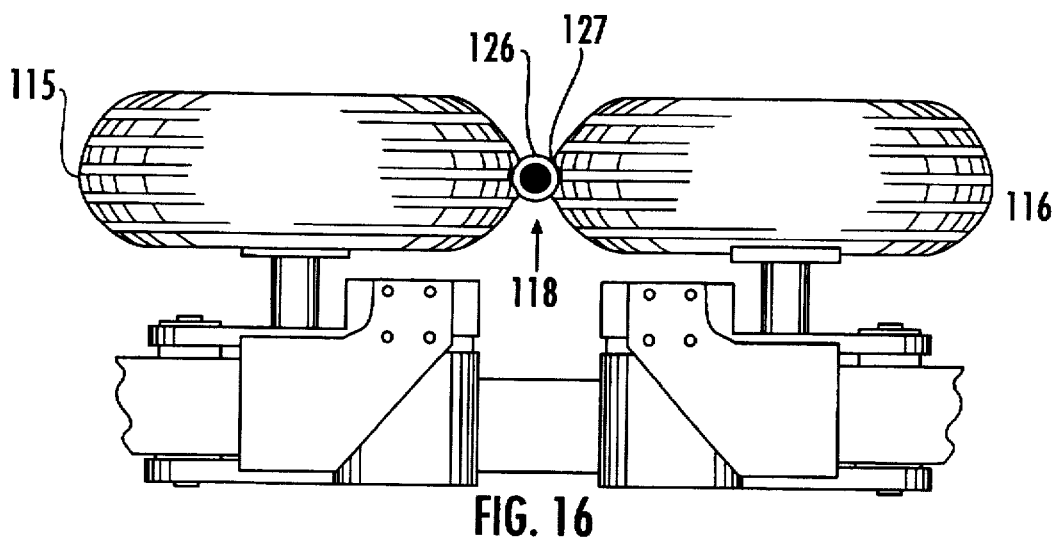
FIG. 16 provides an end view of the cable deployment/ retrieval system of FIG. 6, illustrating the position of two tires in a cable puller arrangement as utilized in FIG. 15, with an exemplary seismic cable situated therebetween, as it would be pulled by the rotation of the tires, as well as the relative deflection of the tires associated therewith.

Referring now to FIG. 16, the tires on the cable pullers utilized in the present invention are configured to be relatively oversized when compared to other, prior art tires, and further the tires are filled to an air pressure less than what one would likely normally utilize in most applications involving the tires. With the present tire arrangement, it has been found that the cable puller tires 115, 116 provide a better, yet less damaging friction grip on the cable 126, the tires deflecting 127 to accommodate the cable during their rotational/pulling operations, without the need for space adjustments 118.

Figure 17:
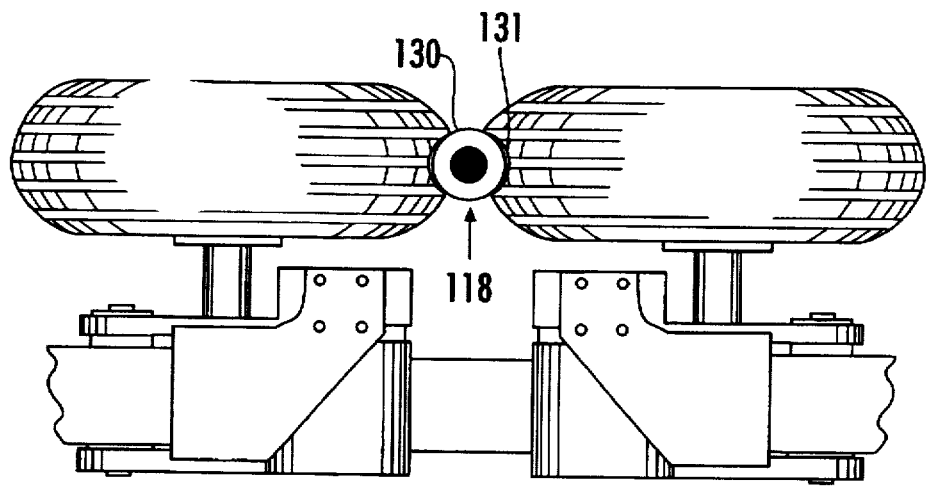
FIG. 17 provides an end view of the cable deployment/ retrieval system of FIG. 6, illustrating the position of two tires in a cable puller arrangement as utilized in FIG. 15, with an exemplary seismic cable connector situated therebetween, as it would be pulled by the rotation of the tires, as well as the relative deflection of the tires associated therewith.

Further, as shown in FIG. 17, when the cable connector 130 (28 in FIG. 8) passes between the tires, the tires merely deflect 131 more, providing a relatively soft, yet firm grip to the connector in a non-damaging, but effective pulling operation. Again, the spacing 118 between the tires need not be mechanically adjusted; the tire merely deflects, and the connector is pulled therethrough.

Figure 14:
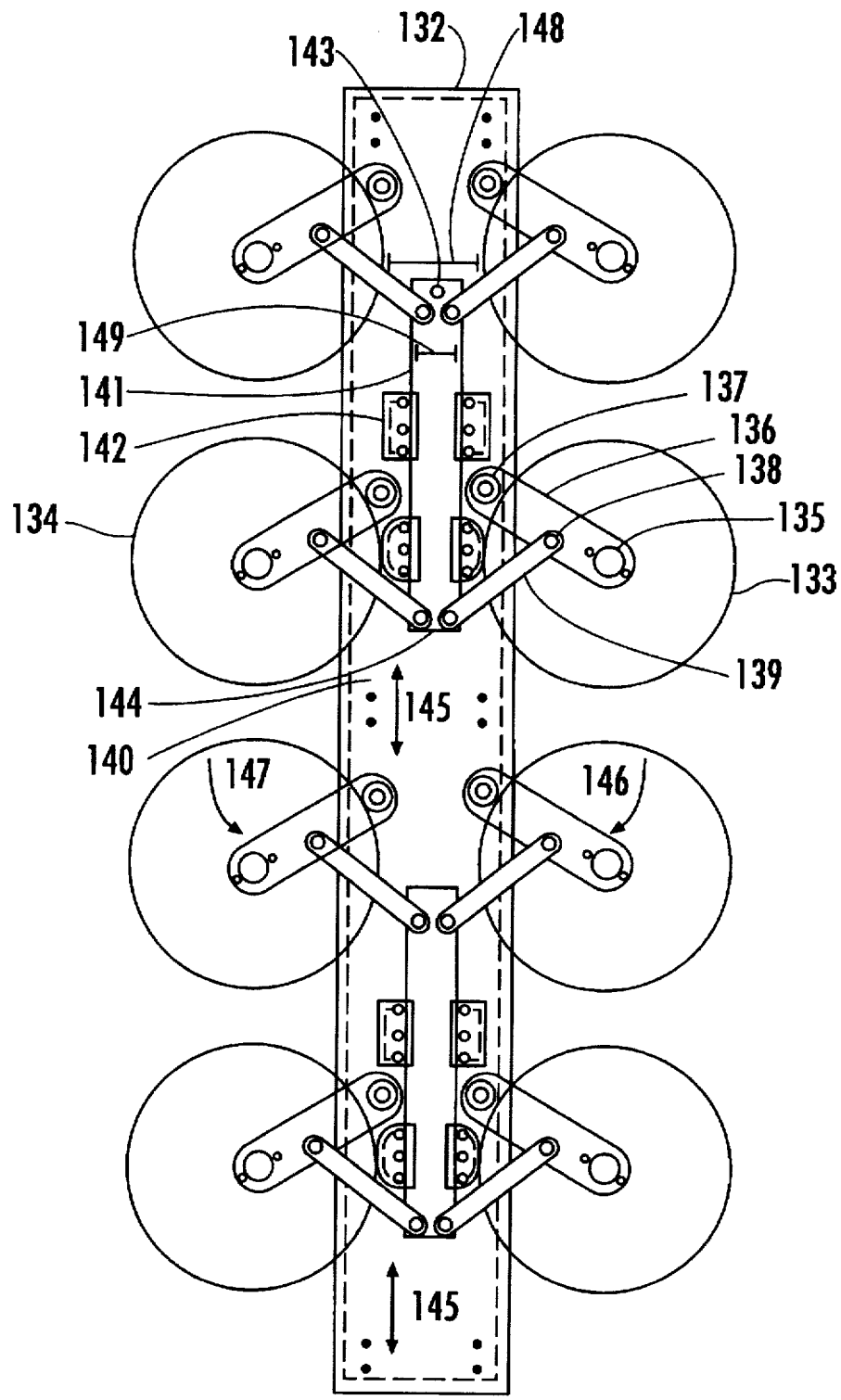
FIG. 14 provides a cut-away view of the mechanics of an exemplary cable deployment retrieval system, detailing an exemplary means to vary the space between the cable puller wheels.

FIG. 14 illustrates an exemplary mechanical means of spacing the opposing pairs of tires in the cable puller arrangement as used in the present system, including the front and rear cable pullers on the upper level deck, as well as the floating cable puller on the main deck. As shown the base member 140 of the spacer member 132 supports first 133 and second 134 sets of opposing tires, each supported by a vertical shaft 135. A tire support member (under the tire shown) engages the shaft 135 at one end, and is pivotally connected 137 to the support member at the other end. As further shown, the first end of a pivot member 139 is pivotally connected 138 to the medial area of the tire support member 136, the other end connected to slider member 141, which has first 143 and second 144 ends. The slider member is slidingly connected to 142 to the base member 140, such that longitudinal movement 145 of the slider member, which may be powered via motor, cylinder, or servo, causes the respective pairs of gripping wheels to pivot closer together 146, 147 or spread further apart, from an open tire position 148 to a cable gripping position 149 depending upon the direction the slider bar is urged.

Recording and Cable-Powering Systems. The recording system used is a Syntrac 480 Ocean Bottom Cable System, manufactured by Syntron Inc. The system comprises the following features:

| Type and Manufacture: | Syntrac 480 Ocean Bottom Cable System, Syntron Inc. |
|---|---|
| Recording format/density: | 3480 cassettes |

-continued

| | |
|---|---|
| No. of channels/SR: | 1920/2 ms |
| Locut/Hicut filters: | According to specification for particular project |
| Preamp. gain: | 24 dB +/- 0.2% typical, 0.5% max |
| Input noise: | 0.2uBar RMS typical |
| Dynamic Range: | 110 dB |
| Tape transport: | 3480 cassette drives |
| Camera: | OYO |
| Attribute data set: | Attribute analysis for QC purposes, and 2D brute stacks. |

Before the start of each days production, daily tests should be conducted for submittal at the end of the day with a summary and failure log of the test in accordance with a Field Quality Control manual. These test include:

1) Pulse Test
2) Continuity Test
3) Pulse test on receivers and display results to camera.
4) Record ambient noise.
5) Leakage Continuity Test on the bottom cable and Sensors to identify dead sensors.
6) Sensor Output.

Several tests should be conducted weekly including:

1) Total Harmonic Distortion
2) Crossfeed Isolation
3) Common Mode Rejection
4) Dynamic Range Test
5) Pulse Test
6) Equivalent Input Noise.

Finally, there are several test which should be conducted on a monthly basis including:

1) Total Harmonic Distortion
2) Crossfeed Isolation
3) Common Mode Rejection
4) A/D Converter Linearity
5) Dynamic Range Test
6) Pulse Test
7) Equivalent Input Noise.

While a ProMax can offer high quality 2D processing, it can only be considered as QC Tool during full 3D surveys. However, through Tensor fully functional onboard processing utilizing an Intel Hypercube MPP up to onboard migration.

A quality control (QC) system is provided to monitor specified attributes, coupled with the availability of on board QC processing. This gives a real time assessment of the data set. The crews are equipped with three IBM 6000 series, real time assessment of the data set. Each work station has disc space equal to 10 to 11 GB of memory. A Promax processing package is offered as standard to provide an array of 2d QC processing tools. The second system operates the QC Tools 'Census' system. In addition to controlling the binning, this system is also capable of user defined attribute mapping. A second Promax provides 3D near trace cube processing.

The cable power system supplies power to the ocean-bottom cables. This system draws power from the normal power supply source for the ship. The power is provided to the cables upon coupling the cables to the cable-handling/recording vessel. See FIG. 5. Also, the recording instruments and equipment are stored in a recording room (20), shown in FIG. 6.

Position and Navigation Systems. The surveys are accomplished with a Syntrack Digital Bottom Cable System. Positioning and Navigation control is accomplished utilizing DGPS as a primary system with a secondary DGPS system for backup. A minimum of two reference stations and an integrity monitor are required for this system to be efficient. Receiver positioning is accomplished with the use of Syntron's ARPS (Acoustic Range Positioning System). This system is accurate to 1 meter, relative to the navigation system.

On board QC will include attribute modeling through QC Tools 'Census' systems. Theoretical and actual offset and fold binning plots are produced. Binning files are also collected in the context of the entire survey so that the attributes are monitored not only on a patch by patch basis but in the cumulative. 'ProMax' is available to provide onboard QC processing to brute stack. Additional QC software will include OBRL Vs Acoustic solution results and Gun QC on board the recording vessel. Navigation post processing is completed onboard.

An INS (Integrated Navigation System) remotely links five or more operating systems located on each of the vessels assigned to the survey. There is a navigation system utilizing DGPS for both prime and secondary positioning. A minimum of two Differential stations are maintained along with an integrity monitoring station at all times. The raw data that is used to calculate the corrections is gathered on an exibite archiving system. The INS is capable of many features that are critical to an efficient bottom cable operations.

The system includes a Hazard display system that can be loaded with known obstructions along with pre plotted source and receiver line positions. Typically the hazard displays are also loaded with the day to day operational hazards, buoys, etc. These daily hazards are added and subtracted to the Hazard data base as the crew progresses through the survey. Two other features are integrated into the hazard display: an asset monitor and a DP (Dynamic Positioning) screen.

The asset monitor updates the position of each of the vessels in the survey area every few seconds. Individual ships positioned are polled port to port from a mothership (in this case the recording vessel) and then displayed on the Hazard screen along with the other details that are part of its data base. This feature gives the crew a quick heads up display as to each ships position relative to the various obstructions. It also allows the crew administrators to properly manage the vessels in the most efficient manner dependent on their location. This display gives a quick reference when a potential question regarding positioning or tracking arises.

The DP screen allows the crew a board the recording vessel to set an aperture around the DP point where they will be positioned on each patch. The Helmsman can then have an easy reference to the position of the DP vessel with relation to the maximum offset that the vessel can deviate from the original point. The display insures that the helm and navigation both are monitoring the vessel during DP operations. Both locations are monitored by an alarm system which activates if the vessel exceeds the maximum offset that has been input into the systems.

This is a safety advantage when DP operations are conducted within an obstructed area. The hazard display and the positions that are being fed to the DP system are operated independently from the remaining navigation system. It does however use the toggle to the main navigation system as a backup in the event that the primary DP system fails.

The cable-handling/recording vessels are equipped with an INS capable of calculating position independently from the other vessels. Each cable-handling/recording vessel system integrates with, an antenna located over the drop position, a digital fathometer, and a port to port communication system. The primary function, which was outlined above, is to feed positions to the Dynamic Positioning system which holds the cable-handling/recording vessel on location during the acquisition phase of the project. The secondary system will act as the spoke or the hand off for remote vessel positioning. Port to Port file transfer is utilized so that data sets from various vessels can be transmitted to the Recording Vessel. The second system that is used for file transfer and remote positioning act as a backup system to the main DP navigation system in the event of a failure of the primary system.

The INS aboard the source vessel calculates a fit from several positions on and around the vessel. The main fit is derived from the mast of the vessel. In addition to the mast fit each of the outside gun arrays are equipped with a GPS antenna located midway out the array. The position of the two antennas on the array is taken and an angle and offset to the middle of the array is applied. The mean of the two antenna is then calculated. From this calculation a range and bearing back to the mast is calculated, which produces the final source fit. The INS is also integrated with the Acoustical transmission system and Macha timing interface for the gun timing.

Receiver Location Systems. A Syntron Acoustics system is used to locate the receivers. This system transmits a timed acoustical signature which is located in a sea chest on the Source boat. A series of timed pulses at a frequency of 77 KHz are transmitted at predetermined intervals along lines running offset from (min of 100 m) or orthogonal to the receiver lines. As the Source boat moves from one PING point to the next it transmits the location from which each acoustical signature was triggered back to the recording vessel. The recording vessel then records the transmitted location along with the ranges that are picked up by each of the acoustical receivers located on the bottom. The acoustical receivers are located at each receiver group on the sea floor and are bridged electrically across the hydrophone pair of each receiver group. As the acoustical sequence begins, the source boat sends a signal to the Syntrak system aboard the Recorder, that the acoustical pulse is about to take place. The recorders Syntrak then shuts down any seismic acquisition and throws a 5 volt signal which is generated from the sea floor modules, to acoustical receivers located at the individual receiver groups. This signal activates the acoustical receivers. The pulse is then transmitted from the source boat and a range is measured by the acoustical receivers. The signatures are then digitized at the sea floor module and transmitted back to the Recorder, where they are combined with the location of the transmission that has been sent to the Recorder by the Source. Each sea floor receiver will collect numerous ranges from an aperture of some 700 meters. Once the entire cable has been pinged the ARPS side of the acoustical system will be given the command to solve for the location and it will compute the receiver locations. The output can then be analyzed in printout form or take to a coordinate conversion, through a DXF input and displayed on ACAD along with other layers that allow the receiver locations to be analyzed against "AS LAID" or "PREPLOT" files. The solution s can be analyzed on the recording vessel within 30 minutes of acquisition.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

I claim:
1. A method for acquiring common reflection point seismic data, the method comprising:
deploying a first ocean-bottom cable from a first cable-handling/recording vessel;
generating first source waves with a source vessel for data acquisition;
recording data from the first ocean-bottom cable with the first cable-handling/recording vessel during said generating first source waves;
preparing a second ocean-bottom cable with a second cable-handling/recording vessel during said generating first source waves;
generating second source waves with the source vessel for data acquisition; and
recording data from the second ocean-bottom cable with the second cable-handling/recording vessel during said generating second source waves.

2. A method as in claim 1, wherein said deploying a first ocean-bottom cable comprises deploying a first plurality of ocean-bottom cables.

3. A method as in claim 1, further comprising preparing the first ocean-bottom cable for data collection with the first cable-handling/recording vessel.

4. A method as in claim 3, wherein said preparing the first ocean-bottom cable comprises pre-data acquisition testing of the first ocean-bottom cable.

5. A method as in claim 4, wherein said testing comprises running at least one test of the group of tests consisting of: Pulse Test, Continuity Test, Pulse test on receivers and display results to camera, Record Ambient Noise, Total Harmonic Distortion, Crossfeed Isolation, Common Mode Rejection, Dynamic Range Test, Equivalent Input Noise, A/D Converter Linearity, Cable Leakage & Continuity, and Sensor Output.

6. A method as in claim 3, wherein said preparing the first ocean-bottom cable comprises pre-data acquisition calibration of recording equipment onboard the first cable-handling/recording vessel.

7. A method as in claim 3, wherein said preparing the first ocean-bottom cable comprises locating receivers on the first ocean-bottom cable.

8. A method as in claim 1, wherein said preparing the second ocean-bottom cable comprises pre-data acquisition testing of the second ocean-bottom cable.

9. A method as in claim 8, wherein said testing comprises running at least one test of the group of tests consisting of: Pulse Test, Continuity Test, Pulse test on receivers and display results to camera, Record Ambient Noise, Total Harmonic Distortion, Crossfeed Isolation, Common Mode Rejection, Dynamic Range Test, Equivalent Input Noise, A/D Converter Linearity, Cable Leakage & Continuity, and Sensor Output.

10. A method as in claim 1, wherein said preparing the second ocean-bottom cable comprises pre-data acquisition calibration of recording equipment onboard the second cable-handling/recording vessel.

11. A method as in claim 1, wherein said preparing the second ocean-bottom cable comprises locating receivers on the second ocean-bottom cable.

12. A method as in claim 1, further comprising deploying the second ocean-bottom cable with the second cable-handling/recording vessel during said generating first source waves.

13. A method as in claim 12, wherein said deploying the second ocean-bottom cable comprises deploying a second plurality of ocean-bottom cables.

14. A method as in claim 1, further comprising connecting the first cable-handling/recording vessel to the first ocean-bottom cable for a recording mode.

15. A method as in claim 1, further comprising connecting the second cable-handling/recording vessel to the second ocean-bottom cable for a recording mode during said generating first source waves.

16. A method as in claim 1, further comprising retrieving the first ocean-bottom cable onto the first cable-handling/recording vessel during said generating second source waves.

17. A method as in claim 1, further comprising retrieving the second ocean-bottom cable onto the second cable-handling/recording vessel.

18. A method for acquiring seismic data, the method comprising:

deploying a first ocean-bottom cable from a first cable-handling/recording vessel;

preparing the first ocean-bottom cable for data collection with the first cable-handling/recording vessel;

generating first source waves with a source vessel for data acquisition;

recording data from the first ocean-bottom cable with the first cable-handling/recording vessel during said generating first source waves;

deploying the second ocean-bottom cable with the second cable-handling/recording vessel during said generating first source waves;

preparing a second ocean-bottom cable with a second cable-handling/recording vessel during said generating first source waves;

generating second source waves with the source vessel for data acquisition;

recording data from the second ocean-bottom cable with the second cable-handling/recording vessel during said generating second source waves; and retrieving the first ocean-bottom cable onto the first cable-handling/recording vessel during said generating second source waves.

19. A method as in claim 18, wherein said preparing the first ocean-bottom cable comprises:

pre-data acquisition testing of the first ocean-bottom cable;

pre-data acquisition calibration of recording equipment onboard the first cable-handling/recording vessel;

locating receivers on the first ocean-bottom cable.

20. A method as in claim 18, wherein said preparing the second ocean-bottom cable comprises:

pre-data acquisition testing of the second ocean-bottom cables;

pre-data acquisition calibration of recording equipment onboard the second cable-handling/recording vessel;

locating receivers on the second ocean-bottom cable.

21. A method for acquiring seismic data, the method comprising:

deploying a first ocean-bottom cable from a first cable-handling/recording vessel;

deploying a second ocean-bottom cable from the first cable-handling/recording vessel;

generating first source waves with a source vessel for data acquisition;

recording data from the first and second ocean-bottom cables with the first cable-handling/recording vessel during said generating first source waves;

preparing a third ocean-bottom cable with a second cable-handling/recording vessel during said generating first source waves;

generating second source waves with the source vessel for data acquisition;

recording data from the second and third ocean-bottom cables with the second cable-handling/recording vessel during said generating second source waves.

22. A method as in claim 21, further comprising retrieving the first ocean-bottom cable onto the first cable-handling/recording vessel during said generating second source waves.

23. A method as in claim 22, further comprising redeploying the first ocean-bottom cable with the first cable-handling/recording vessel during said generating second source waves.

24. A method as in claim 23, further comprising generating third seismic source waves with the source vessel for data acquisition.

25. A method as in claim 24, further comprising recording data from said third and said redeployed first ocean-bottom cables during said generating third seismic source waves.

26. A method for acquiring common reflection point seismic data, the method comprising:

generating the first seismic waves from a first data acquisition seismic source associated with a source vessel wherein the source vessel travels along a path;

generating second seismic waves nonconcurrent with said generating first seismic waves from a second data acquisition seismic source associated with said source vessel wherein the first and second data acquisition seismic sources are positioned such that said generating first seismic waves and said generating second seismic waves are at a survey line wherein the survey line intersects the path;

receiving reflected seismic waves with an ocean-bottom receiver; and recording the reflected seismic waves.

27. A method as in claim 26, wherein the survey line is perpendicular to the path of the source vessel.

28. A method as in claim 26, further comprising alternating said generating first seismic waves and said generating second seismic waves.

29. A method as in claim 26, further comprising staggering relative positions of the first and second seismic sources.

30. A method as in claim 29, wherein said staggering comprises towing the first seismic source farther behind the source vessel than the second seismic source.

31. A method as in claim 30, further comprising regulating the speed of the source vessel so that said generating first seismic waves and said generating second seismic waves are at a survey line.

32. A method for acquiring seismic data, the method comprising:

towing first and second sources from a source vessel wherein the second source is farther from the source vessel than the first source;

towing the sources until the first source is positioned at a first survey line;

generating a first seismic wave from the first source at the first survey line;

receiving reflected first seismic waves with an ocean bottom receiver;

recording the reflected first seismic waves;

towing the sources, after recording first seismic waves, until the second source is positioned at the first survey line; and generating a second seismic wave from the second source at the first survey line.

33. A method as in claim 32, further comprising:

towing the sources until the first source is positioned at a second survey line;

generating a third seismic wave from the first source at the second survey line;

towing the sources, after generation of the third seismic wave, until the second source is positioned at the second survey line; and generating a fourth seismic wave from the second source at the second survey line.

34. A method as in claim 26, wherein said first seismic source and said second seismic source are spaced apart along a line not parallel to the path of the boat.

* * * * *